(12) United States Patent
Schwartz et al.

(10) Patent No.: US 10,941,721 B2
(45) Date of Patent: Mar. 9, 2021

(54) METHOD AND SYSTEM FOR EXHAUST GAS RECIRCULATION AND HEAT RECOVERY

(71) Applicant: Ford Global Technologies, LLC, Dearborn, MI (US)

(72) Inventors: William Samuel Schwartz, Pleasant Ridge, MI (US); Gregory Patrick McConville, Ann Arbor, MI (US); Chad Allan Baker, Ypsilanti, MI (US); Timothy Noah Blatchley, Dearborn, MI (US); Michael James Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 16/405,780

(22) Filed: May 7, 2019

(65) Prior Publication Data
US 2019/0264625 A1   Aug. 29, 2019

Related U.S. Application Data

(63) Continuation of application No. 15/341,973, filed on Nov. 2, 2016, now Pat. No. 10,323,587.

(51) Int. Cl.
*F02D 41/06*   (2006.01)
*F02D 41/00*   (2006.01)
(Continued)

(52) U.S. Cl.
CPC ......... *F02D 41/005* (2013.01); *F01N 3/0205* (2013.01); *F01N 3/10* (2013.01); *F01N 5/02* (2013.01); *F01P 3/20* (2013.01); *F02D 41/064* (2013.01); *F02D 41/1446* (2013.01); *F02D 41/1448* (2013.01); *F02M 26/14* (2016.02);
(Continued)

(58) Field of Classification Search
CPC ............... F01N 3/0205; F01N 2240/02; F01N 2240/36; F01N 2410/06; F01N 3/0234; F01N 3/2889; F02M 26/28; F02M 26/32; F02M 2026/004; F02M 2026/002;
(Continued)

(56) References Cited

U.S. PATENT DOCUMENTS 6,141,961 A   11/2000   Rinckel
6,155,042 A   12/2000   Perset et al.
(Continued)

FOREIGN PATENT DOCUMENTS

JP   2009085094 A   *   4/2009
WO   2009068504 A1      6/2009

OTHER PUBLICATIONS

Machine translation of JP-2009085094-A, accessed on Jul. 17, 2020. (Year: 2020).*

*Primary Examiner* — Jonathan R Matthias
(74) *Attorney, Agent, or Firm* — Geoffrey Brumbaugh; McCoy Russell LLP

(57) ABSTRACT

Methods and systems are provided for exhaust heat recovery and EGR cooling via a single heat exchanger. In one example, a method may include selecting a specific mode of operation of an engine exhaust system with the heat exchanger based on engine operating conditions and an estimated fuel efficacy factor. The fuel efficiency factor may take into account fuel efficacy benefits from EGR and exhaust heat recovery.

17 Claims, 9 Drawing Sheets

(51) Int. Cl.
  *F02D 41/14* (2006.01)
  *F01N 3/02* (2006.01)
  *F02M 26/14* (2016.01)
  *F02M 26/15* (2016.01)
  *F02M 26/33* (2016.01)
  *F01N 3/10* (2006.01)
  *F01N 5/02* (2006.01)
  *F01P 3/20* (2006.01)
  *B60H 1/02* (2006.01)
  *F02G 5/04* (2006.01)
  *B60H 1/04* (2006.01)
  *F02N 19/10* (2010.01)

(52) U.S. Cl.
  CPC ............ *F02M 26/15* (2016.02); *F02M 26/33* (2016.02); *B60H 1/025* (2013.01); *B60H 1/04* (2013.01); *F01P 2060/08* (2013.01); *F01P 2060/16* (2013.01); *F02D 2041/1472* (2013.01); *F02D 2200/021* (2013.01); *F02G 5/04* (2013.01); *F02N 19/10* (2013.01); *F02N 2200/0804* (2013.01); *Y02T 10/12* (2013.01); *Y02T 10/40* (2013.01)

(58) Field of Classification Search
  CPC . F02M 2026/0025; F02D 9/04; F02D 41/005; F02D 41/0077
  See application file for complete search history.

(56) References Cited

U.S. PATENT DOCUMENTS

| | | |
|---|---|---|
| 8,418,461 B2 | 4/2013 | Siuchta |
| 9,689,295 B1 | 6/2017 | Uhrich et al. |
| 9,845,750 B2 | 12/2017 | Styles et al. |
| 9,957,871 B2 | 5/2018 | Uhrich et al. |
| 10,018,097 B2 | 7/2018 | Styles et al. |
| 10,087,803 B2 | 10/2018 | Uhrich et al. |
| 2008/0190108 A1 | 8/2008 | Eitel et al. |
| 2012/0180452 A1 | 7/2012 | Caine |
| 2014/0150758 A1 | 6/2014 | Zurlo et al. |
| 2014/0196454 A1 | 7/2014 | Ulrey et al. |
| 2015/0060192 A1 | 3/2015 | Wink et al. |
| 2015/0121848 A1 | 5/2015 | Pursifull |
| 2016/0115910 A1 | 4/2016 | Bramson |
| 2016/0290205 A1 | 10/2016 | Hebert et al. |

\* cited by examiner

1st MODE

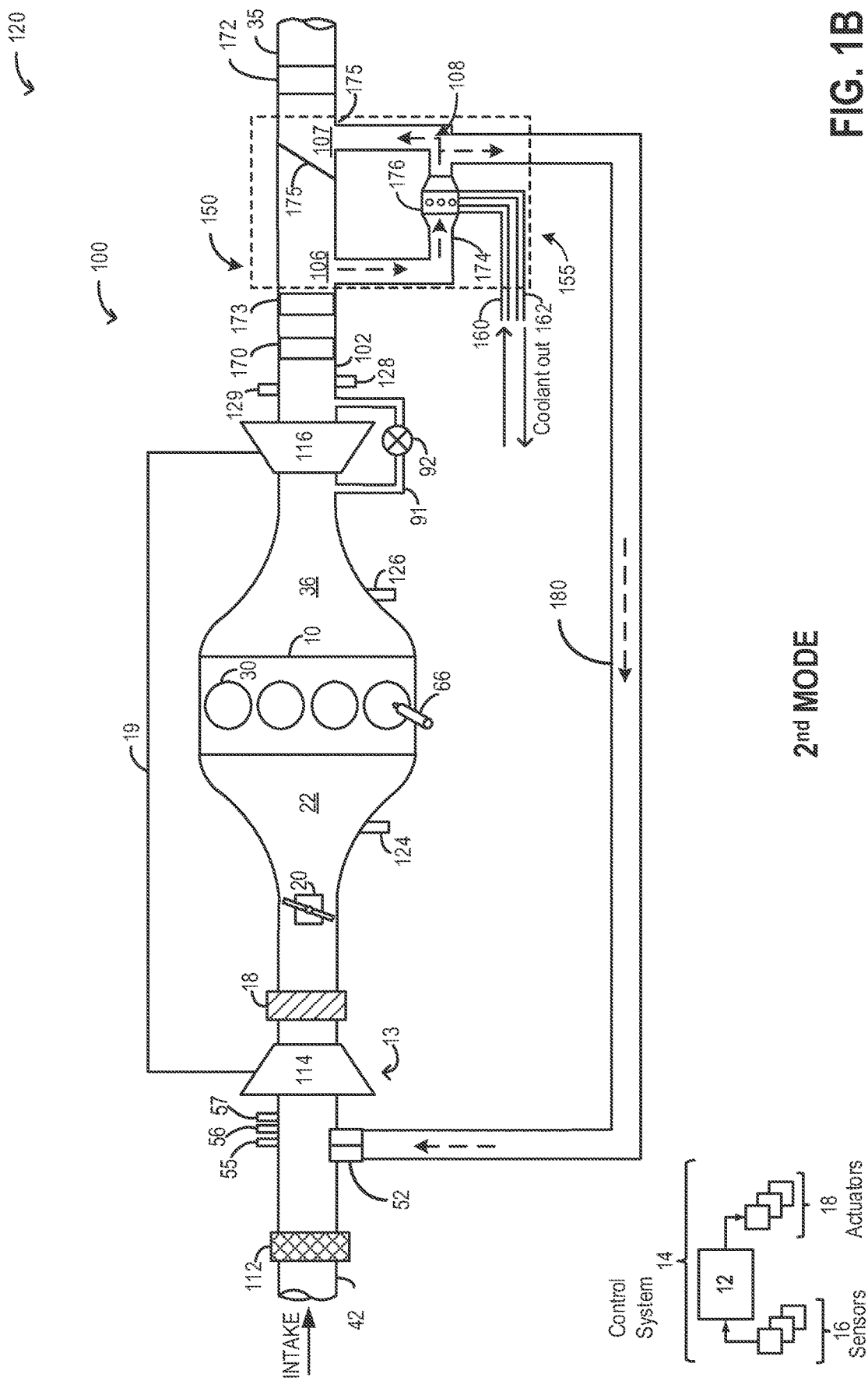

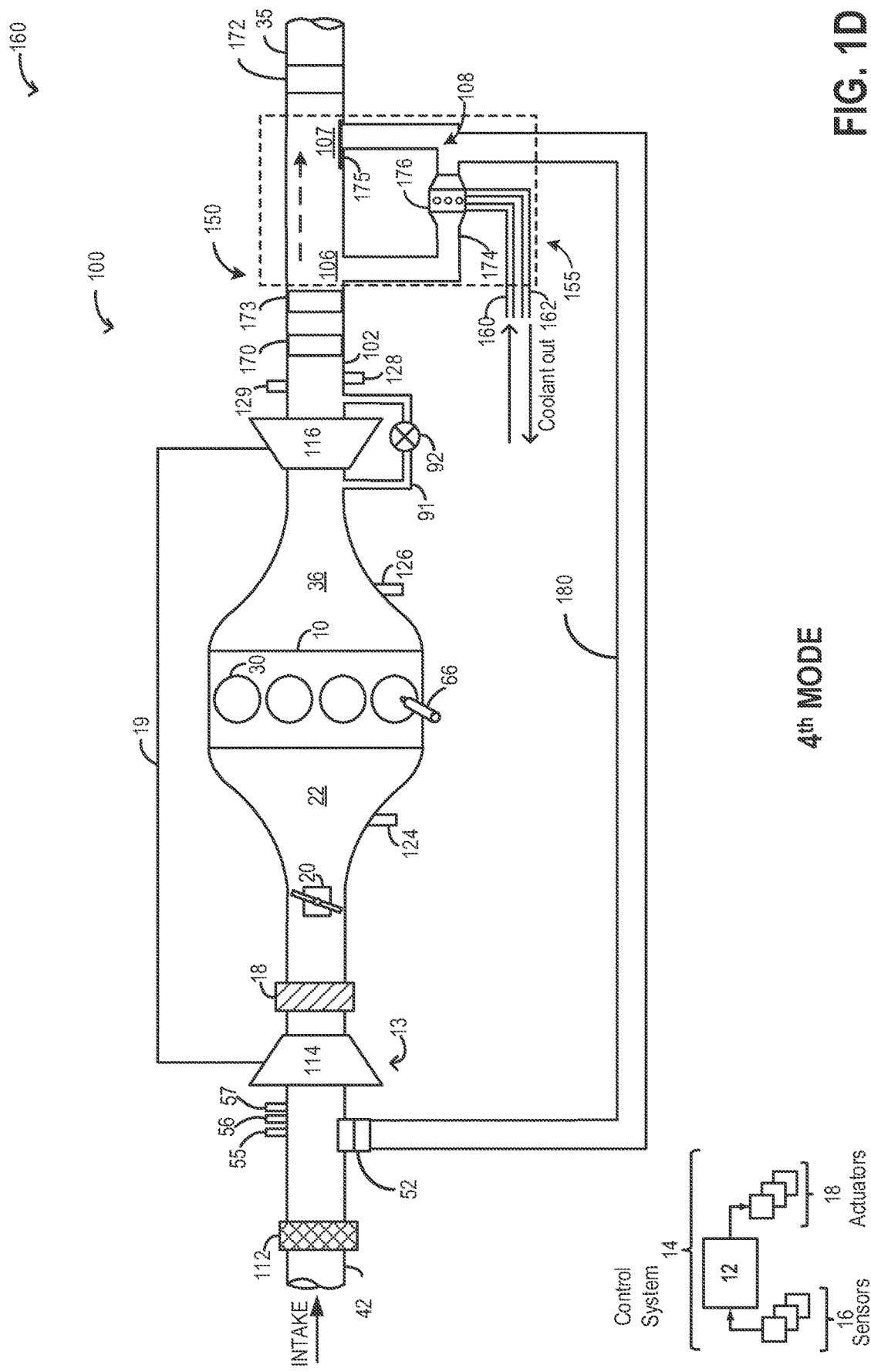
FIG. 1D  4th MODE

FIG. 5

| Operating mode | Engine condition | EGR valve position | Diverter valve position | Exhaust flow through heat exchanger |
|---|---|---|---|---|
| 1 | Cold-start, EGR not desired, exhaust heat recovery desired | Closed | 1st | Yes |
| 2 | EGR desired, exhaust heat recovery desired | Open | 1st | Yes |
| 3 | Cold EGR desired, exhaust heat recovery not desired | Open | 2nd | Yes |
| 4 | EGR, and exhaust heat recovery not desired | Closed | 2nd | No |

500

502
504
506
508

METHOD AND SYSTEM FOR EXHAUST GAS RECIRCULATION AND HEAT RECOVERY

CROSS REFERENCE TO RELATED APPLICATIONS

The present application is a continuation of U.S. Non-Provisional patent application Ser. No. 15/341,973, entitled "METHOD AND SYSTEM FOR EXHAUST GAS RECIRCULATION AND HEAT RECOVERY", and filed on Nov. 2, 2016. The entire contents of the above-listed application are hereby incorporated by reference for all purposes.

FIELD

The present description relates generally to methods and systems for exhaust gas heat recovery and exhaust gas recirculation (EGR) cooling via a single heat exchanger.

BACKGROUND/SUMMARY

Engines may be configured with an exhaust heat recovery system for recovering heat of exhaust gas generated at an internal combustion engine. The heat recovered at an exhaust gas heat exchanger may be utilized for functions such as heating the cylinder head, and warming the passenger cabin, thereby improving engine, and fuel efficiency. Cooled exhaust gas may be recirculated to the intake manifold and used to reduce fuel consumption, and exhaust NOx emissions. Further, EGR may be used to assist in the reduction of throttling losses at low loads, and to improve knock tolerance. An EGR cooler may be coupled to an EGR delivery system to bring down the temperature of recirculated exhaust gas before it is delivered to the intake manifold.

Various approaches are provided for exhaust heat recovery and EGR cooling. In one example, as shown in US 20140196454, Ulrey et al. discloses an engine system with a post-catalyst EGR cooler that may be opportunistically used to recover exhaust heat for heating the engine. During cold-start conditions, an exhaust throttle valve may be closed to direct exhaust through the EGR cooler wherein heat from the exhaust may be transferred to a coolant circulating through the EGR cooler. The coolant (warmed with the recovered exhaust heat) may then be circulated through the engine to increase engine temperature. During such cold-start conditions, the EGR valve may be maintained in a closed position, and after flowing through the EGR cooler, the exhaust may return to the main exhaust passage via a bypass passage.

However, the inventors herein have recognized potential disadvantages with the above approach. As one example, in the system shown by Ulrey et al., it may not be possible to restrict undesired exhaust flow though the EGR delivery passage and the bypass passage even when the exhaust throttle is in a fully open position. During higher than threshold engine temperature and engine load conditions, since it may not be possible to completely bypass the heat exchanger, undesired flow of hot exhaust through the coolant system may adversely affect the functionality of the coolant system. Also, it may not be possible to control concurrent exhaust heat recovery and cooled EGR delivery in order to improve fuel efficiency. Further, in the above mentioned heat exchange system, during use of the heat exchanger for EGR cooling, condensate may collect in the heat exchanger and can enter the intake manifold via the EGR passage, adversely affecting engine combustion stability. Condensate remaining in the heat exchanger during prolonged periods of engine shut down may freeze and can also cause damage to the EGR system components.

The inventors herein have identified an approach by which the issues described above may be at least partly addressed One example engine method comprises: operating an engine exhaust system in a first mode with exhaust flowing to a tailpipe via a heat exchanger, and operating the system in a second mode with a first portion of exhaust recirculating to an intake manifold, and a second portion of the exhaust flowing to the tailpipe via the heat exchanger. In this way, EGR cooling and exhaust heat recovery may be simultaneously provided via a common heat exchanger. Another example method includes: during an engine cold-start, operating an exhaust system in a mode with exhaust flowing to a tailpipe via a heat exchanger coupled in a bypass passage; and after the engine cold-start, operating the exhaust system in another mode with exhaust recirculating through a recirculation passage to an intake manifold via the heat exchanger, the recirculation passage coupled to the bypass passage downstream of the heat exchanger.

In one example, an engine system may be configured with a heat exchanger positioned downstream of a catalytic convertor in an exhaust bypass disposed parallel to a main exhaust passage. A diverter valve may be used to enable exhaust gas to be diverted into the bypass passage, and through the heat exchanger. An EGR delivery passage may be coupled to the bypass passage downstream of the heat exchanger, and an EGR valve may be coupled to the delivery passage to control exhaust flow into the intake manifold. Adjustments to the position of the diverter valve and the EGR valve may be coordinated for exhaust heat recovery and EGR delivery. For example, during engine cold-start conditions, exhaust may be routed from the exhaust manifold to the tailpipe via the heat exchanger. During the flow, exhaust heat may be transferred to a coolant circulating around the heat exchanger, and the hot coolant may then be used for engine and cabin heating. After catalyst light-off, when cooled EGR is requested, the exhaust may be routed to the intake manifold via the EGR passage after flowing through the heat exchanger operating as an EGR cooler. Based on engine heating demand relative to EGR demand, a position of the diverter valve and the EGR valve may be adjusted to flow a first part of exhaust to the intake manifold via the heat exchanger and the EGR delivery passage, while simultaneously flowing a second (remaining) part of exhaust to the tailpipe via the heat exchanger. The controller may also adjust the ratio of the first part relative to the second part based on a comparison of fuel efficiencies in each mode. Further, a level of condensate formation at the heat exchanger may be estimated, and if the level of condensate is higher than a threshold level, the entire volume of exhaust may be routed to the tailpipe via the heat exchanger in order to purge the accumulated condensate to the atmosphere. The condensate may also be purged to the tailpipe responsive to an engine shut-down event.

In this way, by providing the functions of an EGR cooler and an exhaust gas heat exchanger via a single heat exchanger, cost and component reduction benefits are achieved without limiting the functionality or capability of either system. The technical effect of coupling the heat exchanger in an exhaust bypass passage connected to an EGR passage is that exhaust heat recovery and EGR flow can be provided simultaneously, increasing fuel economy benefits. By simultaneously providing EGR, and recovering exhaust heat for heating the engine and/or passenger cabin, fuel efficiency may be improved. The technical effect of opportunistically purging condensate accumulated in the heat exchanger to an exhaust tailpipe is that water ingestion in the engine may be reduced, improving combustion stability. Also, by purging the heat exchanger before an engine shut-down, freezing of water in the heat exchanger during cold periods may be reduced, thereby reducing the possibility of EGR component damage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1B shows an example embodiment of an engine system including an engine exhaust system with a heat exchanger, operating in a second mode.

FIG. 1D shows an example embodiment of an engine system including an engine exhaust system with a heat exchanger, operating in a fourth mode.

FIG. 5 shows a table illustrating the different modes of operation of the engine exhaust system of FIGS. 1A-1D.

DETAILED DESCRIPTION

Figure 6:
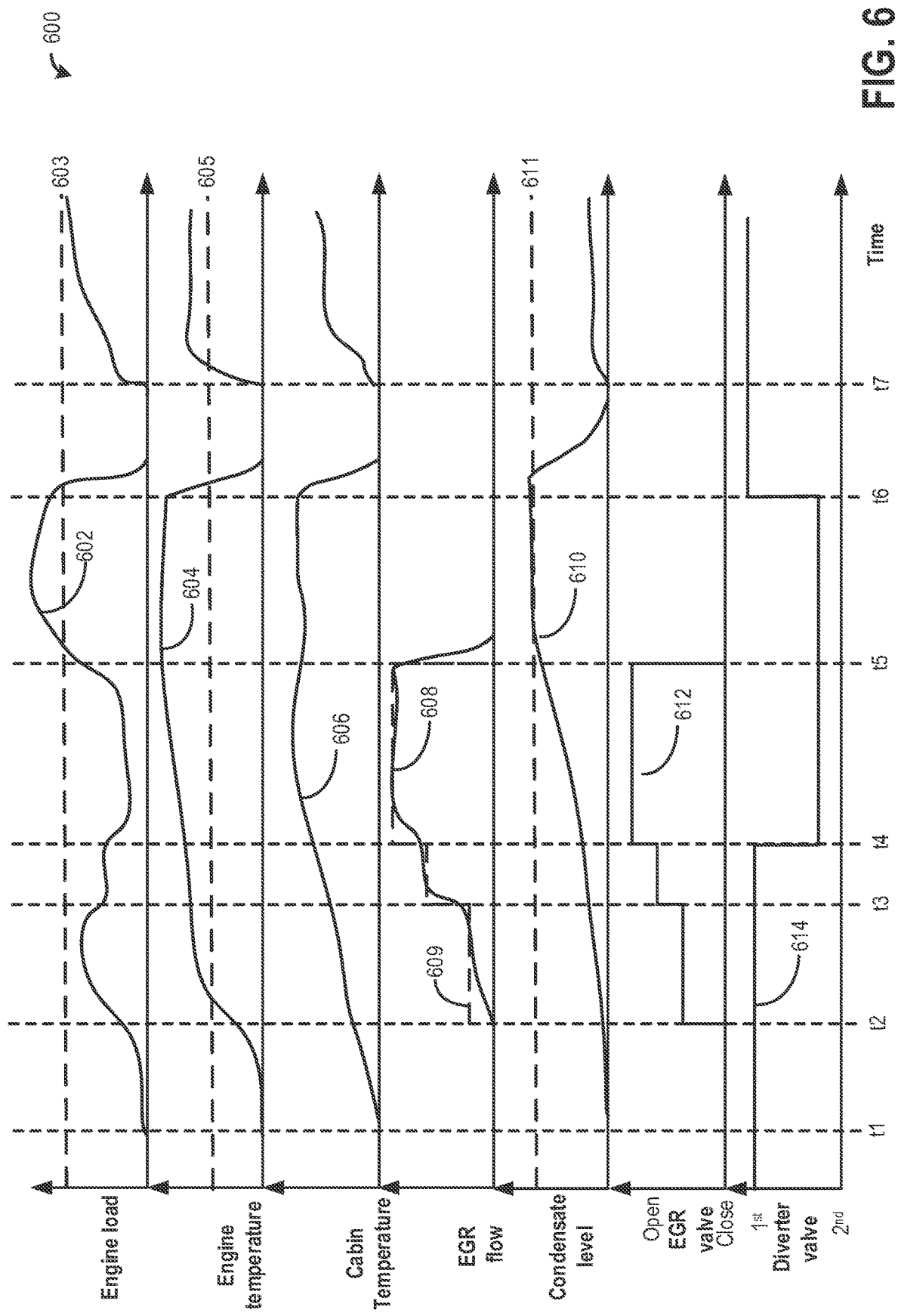
FIG. 6 shows an example operation of the engine exhaust system of FIGS. 1A-1D.

The following description relates to systems and methods for a single heat exchanger for improved exhaust gas heat recovery and exhaust gas recirculation (EGR) cooling. Different modes of operation of an example engine system comprising an engine exhaust system with a heat exchanger are shown in FIGS. 1A-1D. An example embodiment of a vehicle coolant system coupled to the engine system of FIGS. 1A-1D is shown in FIG. 2. An engine controller may be configured to perform a control routine, such as the example routines of FIGS. 3 and 4, to vary the positions of one or more exhaust system valves to adjust exhaust flow through the heat exchanger in the systems of FIGS. 1A-1D. The different modes of operation of the example engine system are tabulated in FIG. 5. An example operation of the systems of FIGS. 1A-1D is shown in FIG. 6.

Figure 1A:
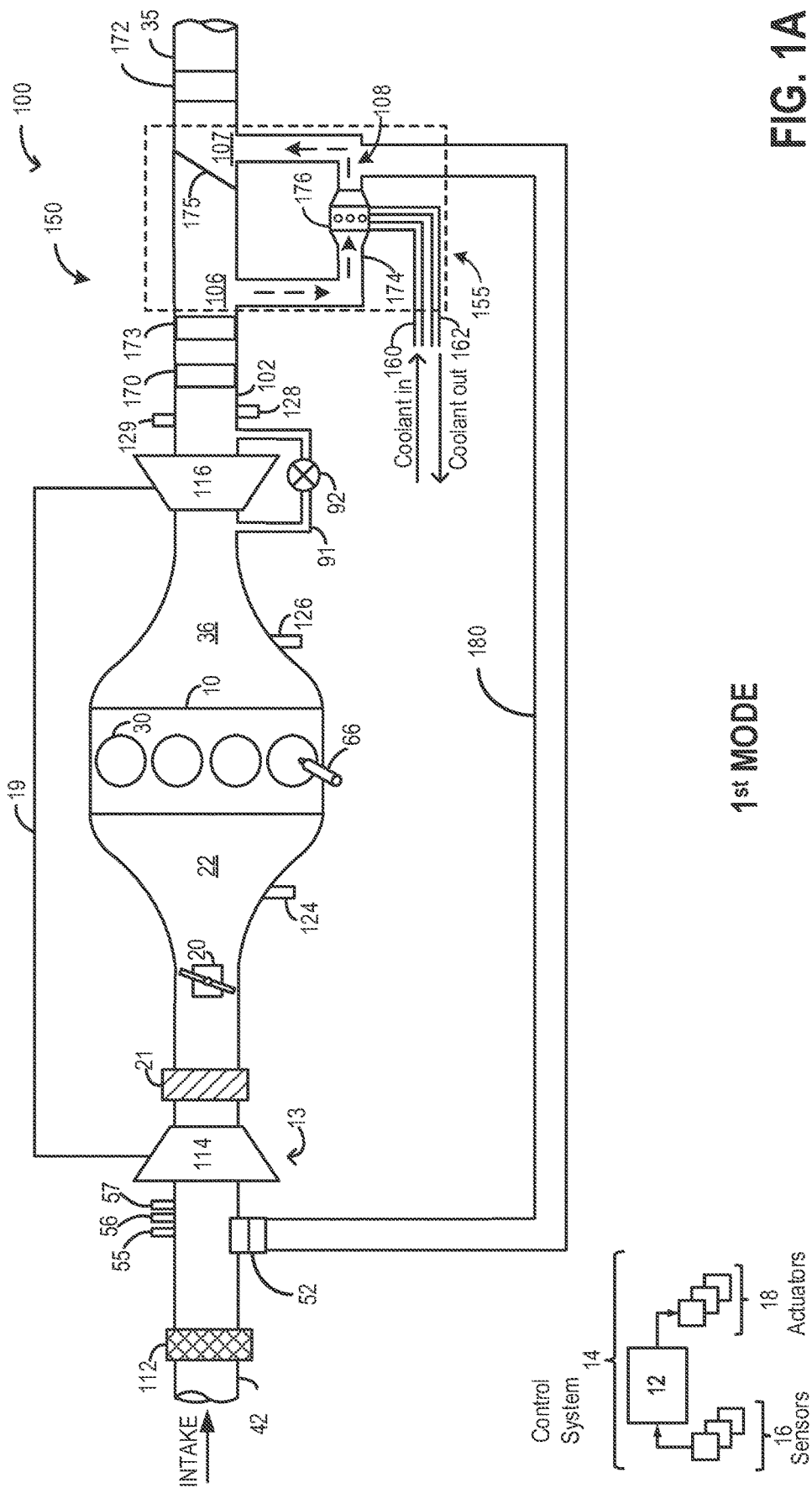
FIG. 1A shows an example embodiment of an engine system including an engine exhaust system with a heat exchanger, operating in a first mode.
Figure 2:
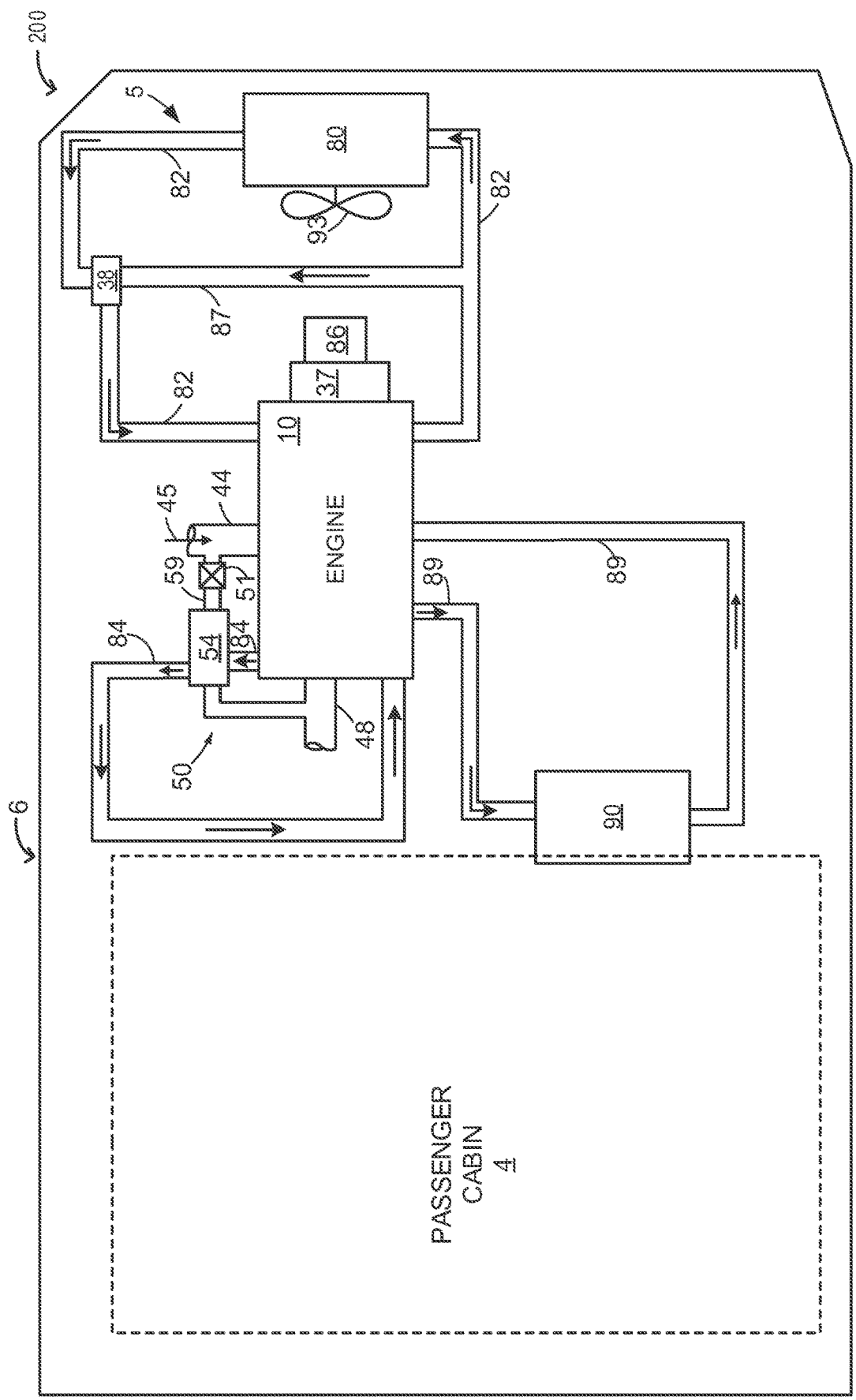
FIG. 2 shows an example embodiment of a coolant system for a vehicle.

FIG. 1A schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled, through charge-air cooler (CAC) 21 to throttle valve 20. Throttle valve 20 is coupled to engine intake manifold 22. From the compressor, the compressed air charge flows through the charge-air cooler 21 and the throttle valve to the intake manifold. In the embodiment shown in FIG. 1A, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 92 may be actuated open to dump at least some exhaust pressure from upstream of the turbine to a location downstream of the turbine via wastegate 91. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1A, exhaust from the one or more exhaust manifold sections may be directed to turbine 116 to drive the turbine. The combined flow from the turbine and the wastegate then flows through emission control devices 170 and 173. In one example, the first emission control device 170 may be a light-off catalyst, and the second emissions control device 173 may be an underbody catalyst. Exhaust after-treatment devices 170 and 173 may be configured to catalytically treat the exhaust flow, and thereby reduce an amount of one or more substances in the exhaust flow. For example, the exhaust after-treatment devices 170 and 173 may be configured to trap $NO_x$ from the exhaust flow when the exhaust flow is lean, and to reduce the trapped $NO_x$ when the exhaust flow is rich. In other examples, the exhaust after-treatment devices 170 and 173 may be configured to disproportionate $NO_x$ or to selectively reduce $NO_x$ with the aid of a reducing agent. In still other examples, the exhaust after-treatment devices 170 and 173 may be configured to oxidize residual hydrocarbons and/or carbon monoxide in the exhaust flow. Different exhaust after-treatment catalysts having any such functionality may optionally be arranged in wash coats in the exhaust after-treatment stages, either separately or together. In some embodiments, the exhaust after-treatment stages may include a regeneratable soot filter configured to trap and oxidize soot particles in the exhaust flow.

All or part of the treated exhaust from the exhaust after-treatment devices 170 and 173 may be released into the atmosphere via main exhaust passage 102 after passing through a muffler 172. One end of a bypass passage 174 of the engine exhaust system 150 may be coupled to the main exhaust passage 102 downstream of the second emission control device 173 at a first junction 106. The bypass passage 174 may extend from downstream of the second emission control device 173 to upstream of muffler 172, the other end of the bypass passage 174 may be coupled to the main exhaust passage 102 at a second junction 107. The bypass passage 174 may be arranged parallel to the main exhaust passage 102. A heat exchanger 176 may be coupled to bypass passage 174 to cool the exhaust passing through the bypass passage 174. In one example, the heat exchanger 176 is a water-gas exchanger. An engine coolant system 155 may be coupled to the exhaust heat exchanger 176 for exhaust heat recovery and EGR cooling. Engine coolant may enter the heat exchanger 176 via a coolant inlet line 160 and after circulating through the heat exchanger 176, the coolant may return to the engine or may be routed to the heater core via a coolant outlet line 162. Exhaust gas recirculation (EGR) delivery passage 180 may be coupled to the exhaust bypass passage 174 at junction 108, downstream of heat exchanger 176, to provide low pressure EGR (LP-EGR) to the engine intake manifold, upstream of compressor 114. In further embodiments, the engine system may include a high pressure EGR flow path wherein exhaust gas is drawn from upstream of turbine 116 and recirculated to the engine intake manifold, downstream of compressor 114. One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an intake oxygen sensor. From downstream of the second emission control device 173, exhaust may flow to muffler 172 via one or more of the main exhaust passage 102 and the bypass passage 174.

A diverter valve 175, coupled to the main exhaust passage 102 between the first junction 106 and the second junction 107, may be used to regulate the portion of exhaust flowing through the bypass passage 174. An EGR valve 52 may be coupled to the EGR passage 180 at the junction of the EGR passage 180 and the intake passage 42. EGR valve 52 may be opened to admit a controlled amount of exhaust to the compressor inlet for desirable combustion and emissions control performance. EGR valve 52 may be configured as a continuously variable valve, or an on/off valve. Depending on operating conditions such as engine temperature, a portion of the exhaust may be diverted through bypass passage 174 and thereon to tailpipe 35 while a remaining portion is diverted from the bypass passage to the inlet of compressor 114 via the EGR passage 180 and the exhaust gas recirculation (EGR) valve 52. Opening of the diverter valve 175 and the EGR valve 52 may be regulated and coordinated to control the flow of exhaust though the bypass passage 174 and the heat exchanger 176 so that exhaust recovery and EGR flow can be provided simultaneously, when required.

As exhaust heat is recovered at the heat exchanger, condensate may start to accumulate in the heat exchanger which upon entering the engine combustion chamber may cause combustion instability. In one example, the level of condensate accumulated in the heat exchanger may be estimated, such as based on the output of a humidity sensor coupled to the heat exchanger. In another example, the condensate level may be estimated based on inputs from exhaust temperature and pressure sensors, 128 and 129, or modeled based on engine operating conditions. In order to reduce ingestion of condensate, the EGR delivery passage 180 may be designed to deliver EGR at a location that is elevated relative to the bypass passage 174 such that larger droplets of condensate do not enter the intake manifold but are confined to the bypass passage 174 due to gravity. As used herein, the EGR passage being at an elevated location includes the EGR delivery passage being located at a position (or plane) in the vehicle under-hood area that is higher with reference to a ground level (e.g., surface of the road the vehicle is travelling on) as compared to the position (or plane) of the bypass passage. Also, the water droplets may be routed to a storage area where they are stored before being opportunistically purged to the tailpipe. In one example, the EGR delivery passage 180 may pass through a high volume chamber with a tray. As the exhaust flows through the chamber, the flow velocity may decrease and water droplets may accumulate on the tray. In another example, a centrifuge or a bend in the EGR delivery passage 180 could be used to force the water droplets to impinge onto the surface of the delivery passage 180 because of relatively higher inertia of the water droplets relative to the exhaust flow. The bend in the EGR delivery passage 180 or the centrifuge may convey the water to a tray filled with desiccant media (such as silica gel) or a hydrophilic surface coating to ensure that the condensate droplets stay attached to the surface of a water removal device.

The storage area, the tray, and/or the heat exchanger containing the condensate may be opportunistically purged when the amount of accumulated condensate increases to above a threshold amount. In one example, during conditions when the engine is spinning unfueled (such as during a DFSO event or during an engine shutdown), an engine controller may fully open the EGR valve to route the condensate into the engine intake manifold, and the condensate may evaporate upon entering the warm engine. Purging using this technique may be carried out once it is confirmed that the engine temperature is sufficiently high (e.g., higher than a threshold), and the possibility of engine misfire events is low. Also, this purging technique may not be used during conditions when higher engine power is desired, or when the engine is operated fueled. The gaseous water vapor may be removed from the engine along with the exhaust flow. In another example, in response to a higher than threshold condensate accumulation in the heat exchanger, the controller may shift the diverter valve to a position that diverts all the exhaust into the bypass passage, and close the EGR valve to flow substantially all the hot exhaust to the tailpipe via the heat exchanger. The accumulated condensate may be flushed out of the heat exchanger to the atmosphere by the hot exhaust. Also, upon receiving an engine shutdown request, the controller may route hot exhaust to the tailpipe via the heat exchanger to remove the condensate through the tailpipe. In this way, during longer engine-off periods, freezing of condensate at the heat exchanger may be reduced.

FIG. 1A shows operation of the engine system in a first operating mode. The first operating mode represents a first setting of the diverter valve 175 and the EGR valve 52 that enables exhaust flow control. In the first operating mode, the diverter valve 175 may be in a first (fully open) position, and the EGR valve 52 may be in a closed position. When in the first operating mode, due to the first position of the diverter valve 175, the entire volume of exhaust exiting the second emissions control device 173 may enter the bypass passage at the first junction 106. The exhaust may then flow through the heat exchanger 176 and then return to the main exhaust passage at the second junction 107. Due to the closed position of the EGR valve 52, the exhaust may not flow into the EGR passage 180 and the entire volume of exhaust may re-enter the main exhaust passage 102. After re-entering the main exhaust passage 102, exhaust may flow through a muffler 172 before being released to the atmosphere. As the exhaust passes through the heat exchanger 176, heat from the hot exhaust may be transferred to a coolant circulating through the heat exchanger 176. Upon transfer of heat from the exhaust to the coolant, the warmed coolant may be circulated back to the engine (such as when engine heating is required) and/or through a heater core for heating a passenger cabin of the vehicle (such as when cabin heating is requested).

The engine system may be operated in the first operating mode (as described above) during cold-start conditions. During this time, EGR may not be desired for engine operation, and the entire heat from the exhaust may be used for heating vehicle components. Condensate from the exhaust may accumulate at the heat exchanger but as exhaust flows towards the tailpipe, the accumulated condensate may be removed to the atmosphere with the exhaust. By adjusting exhaust flow to route hot exhaust through the heat exchanger 176, heat from the exhaust may be recovered by the coolant circulating through the heat exchanger 176. The heat extracted from the exhaust may be used for engine warm-up, and for providing heat to passenger cabin. In this way, by using exhaust heat for cabin heating, cabin heating performance may be improved during cold-start conditions.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas oxygen sensor 126 located upstream of the turbine 116, MAP sensor 124, exhaust temperature sensor 128, exhaust pressure sensor 129, heat exchanger humidity sensor, compressor inlet temperature sensor 55, compressor inlet pressure sensor 56, compressor inlet humidity sensor 57, and engine coolant temperature sensor. Other sensors such as additional pressure, temperature, air/fuel ratio, and composition sensors may be coupled to various locations in engine system 100. The actuators 81 may include, for example, throttle 20, EGR valve 52, diverter valve 175, wastegate 92, and fuel injector 66. The control system 14 may include a controller 12. The controller 12 may receive input data from the various sensors, process the input data, and trigger various actuators in response to the processed input data based on instruction or code programmed therein corresponding to one or more routines. For example, based on engine operating conditions and EGR requirements, the controller 12 may send a signal to adjust the position of the diverter valve 175, and the position of EGR valve 52 to vary the ratio of exhaust gas directed to the intake manifold relative to exhaust directed to the tailpipe via the heat exchanger 176. Also, based on engine operating conditions, opening of EGR valve 52 may be adjusted to draw a desired amount of EGR from the exhaust bypass passage into the engine intake manifold. Example control routines for exhaust flow regulation are described with regard to FIGS. 3 and 4.

FIG. 1B shows a schematic view 120 of operation of the engine system 100 in a second operating mode. Components previously introduced in FIG. 1A are numbered similarly and not reintroduced.

The second operating mode represents a second setting of the diverter valve 175 and the EGR valve 52 that enables exhaust flow control. In the second operating mode, the diverter valve 175 may be in a first position and the EGR valve 52 may be in an open position. When in the second operating mode, due to the first position (fully open) of the diverter valve 175, the entire volume of exhaust exiting the second emissions control device 173 may enter the bypass passage at the first junction 106. The entire volume of exhaust may then flow through the heat exchanger 176. Upon exiting the heat exchanger 176, a first portion of the exhaust may enter the EGR delivery passage 180 at the junction 108 to be delivered to the engine intake passage 42 via the EGR valve 52, and a second portion of the exhaust may return to the main exhaust passage via the second junction 107. As the degree of opening of the EGR valve is increased, the first portion of the exhaust entering the EGR delivery passage may increase relative to the second portion of the exhaust returning to the exhaust main passage via the diverter valve. After reentering the main exhaust passage 102, the second portion of the exhaust may flow through muffler 172 before being released exit to the atmosphere. As the exhaust passes through the heat exchanger 176, heat from the hot exhaust may be transferred to a coolant circulating through the heat exchanger 176. Upon transfer of heat from the exhaust gas to the coolant, the warmed coolant may be circulated back to the engine (such as when engine heating is required) and/or through a heater core for heating a passenger cabin of the vehicle (such as when cabin heating is requested). The EGR delivered to the intake passage 42 may be at least partially cooled at the heat exchanger.

The engine system may be operated in the second operating mode (as described above) after the exhaust after-treatment catalysts 170 and 173 have attained their light-off temperatures. By providing EGR, fuel efficiency, and emissions quality may be improved. The heat extracted from the exhaust at the heat exchanger may be used for further engine warm-up, and for providing heat to a passenger cabin, thereby reducing parasitic use of engine power (for operating auxiliary systems such as heaters) and improving fuel efficiency.

In this second operating mode, EGR delivery and exhaust heat recovery may be carried out simultaneously (EGR and exhaust heat recovery overlap). A fuel efficiency factor may be calculated based on a comparison of the estimated fuel efficiency benefit from providing only EGR (with no exhaust heat recovery) versus the fuel efficiency benefit of providing EGR with concurrent exhaust heat recovery. As such, when a portion of EGR is drawn from downstream of the heat exchanger and a remaining portion is returned to the main exhaust passage, a temperature of the exhaust being recirculated to the engine intake may be higher (as the entire volume of exhaust is cooled at the heat exchanger) than the temperature of the exhaust recirculated to the engine intake when only EGR is drawn (and no exhaust is returned to the main exhaust passage). The lower temperature EGR (provided when only a fraction of exhaust is routed via the heat exchanger 176) may provide a higher efficiency however due to a lower volume of exhaust flow via the heat exchanger, exhaust heat recovery may be lower. The position of the diverter valve 175 may be actuated to a fully open (first) position to flow the entire volume of exhaust through the heat exchanger 176 for both EGR (partially cooled) and exhaust heat recovery (second operating mode) or to a fully closed (second) position to flow a portion of exhaust through the heat exchanger 176 for only EGR (fully cooled) with lower exhaust heat recovery (to be discussed in relation to the third operating mode). Fuel efficiency benefits for each scenario may be based on each of an amount of exhaust recirculated, a temperature of the recirculated exhaust, and an amount of exhaust heat used for engine heating (and passenger cabin heating). The fuel efficiency benefits may increase with each of an increase in the amount of exhaust recirculated, a decrease in the temperature of the recirculated exhaust, and an increase in the amount of exhaust heat used for engine heating and passenger cabin heating. In one example, the ratio of the first portion of exhaust (delivered as EGR) to the second portion of exhaust (routed to tailpipe) may be determined based on the amount of EGR requested (based on a desired dilution level). In one example, the first portion of exhaust recirculated to the intake manifold may be increased and correspondingly the second portion of exhaust routed to the tailpipe may be decreased as the amount of EGR requested increases. Based on the determined ratio, an opening of the EGR valve 52 may be adjusted, the opening increased as the first portion increases, the opening decreased as the second portion increases.

Figure 1C:
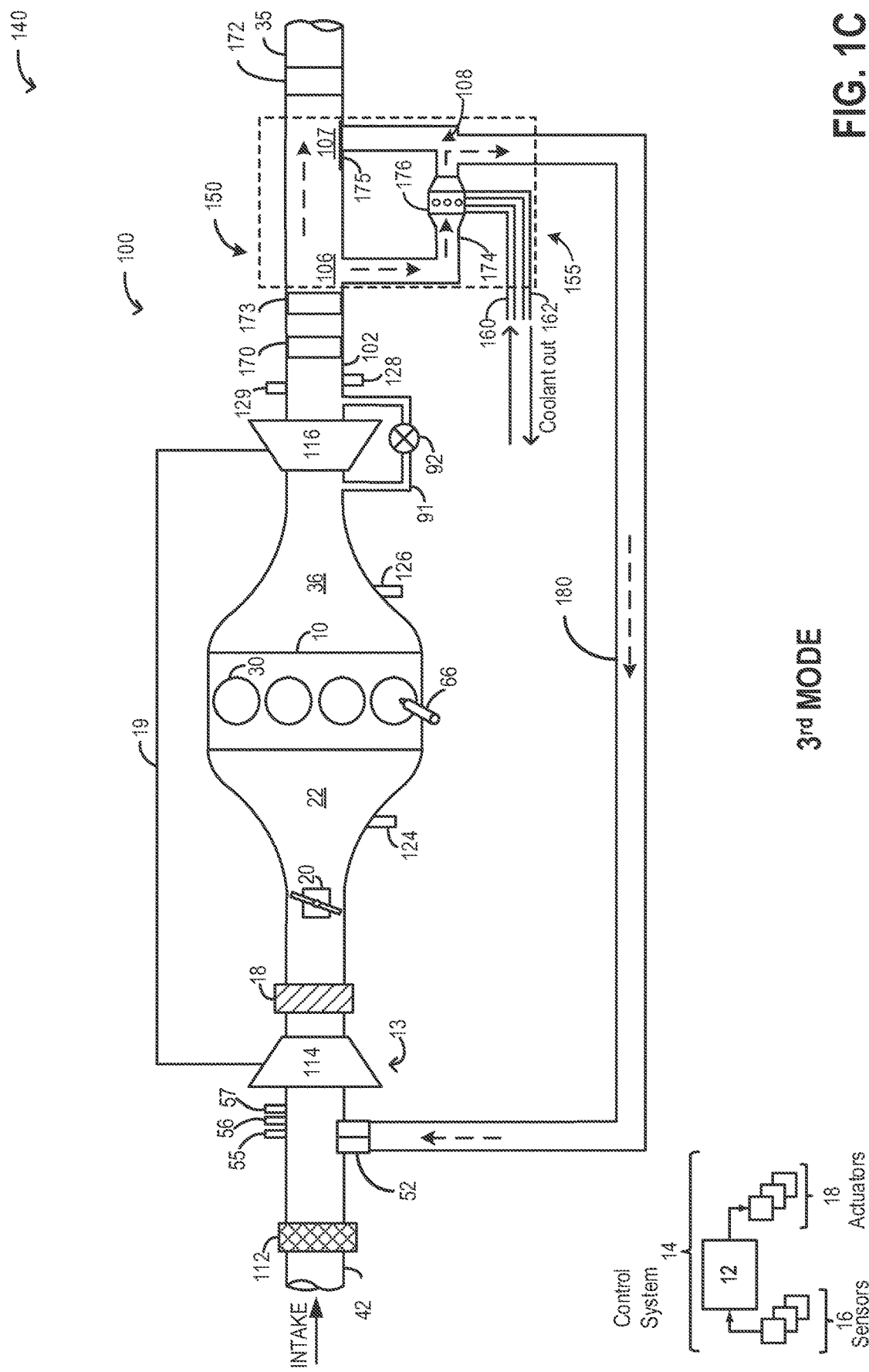
FIG. 1C shows an example embodiment of an engine system including an engine exhaust system with a heat exchanger, operating in a third mode.

FIG. 1C shows a schematic view 140 of operation of the engine system 100 in a third operating mode. Components previously introduced in FIG. 1A are numbered similarly and not reintroduced.

The third operating mode represents a third setting of the diverter valve 175 and the EGR valve 52 that enables exhaust flow control. In the third operating mode, the diverter valve 175 may be in a second (fully closed) position, and the EGR valve 52 may be in an open position. When in the third operating mode, due to the open position of the EGR valve 52 and the second position of the diverter valve 175, a first portion of exhaust exiting the second emissions control device 173 may enter the bypass passage at the first junction 106 but may not return to the main exhaust passage via the second junction 107. A second (remaining) portion of exhaust may not enter the bypass passage but may flow directly to the tailpipe via the muffler 172. The first portion of the exhaust, after being cooled at the heat exchanger 176, may enter the EGR delivery passage 180 at junction 108. The EGR may be delivered to the engine intake manifold via the EGR delivery passage 180, and the EGR valve 52. Since only a fraction of the exhaust flows through the heat exchanger in this mode, the exhaust is cooled to a larger extent. Therefore, the temperature of EGR delivered in the third operational mode may be lower than the temperature of the EGR delivered during the second operational mode. Heat recovered by the coolant from the first portion of exhaust flowing through the heat exchanger may be used for engine heating and/or vehicle cabin heating based on engine heating and cabin heating demands.

The engine system may be operated in the third operating mode (as described above) responsive to a demand for EGR and no demand for engine or cabin heating. By providing cooler EGR responsive to a dilution demand, fuel efficiency and emissions quality may be improved.

The engine system may be operated in the third operating mode when there is a demand for exhaust heat recovery if a first fuel efficiency factor estimated based on a fuel efficiency benefit from concurrently providing partially cooled EGR and exhaust heat recovery is lower than a second fuel efficiency factor estimated based on the fuel efficiency benefit achieved by providing cooled EGR without additional exhaust heat recovery (besides heat recovered by cooling the EGR). If it inferred that the second fuel efficiency factor is higher than the first efficiency factor, the engine system may be operated in the third mode to provide cooled EGR while engine and cabin heating demands are lower and may be substantially fulfilled using the heat recovered from the EGR cooling. The ratio of the first portion of exhaust (delivered as EGR) to the second portion of exhaust (directly routed to the tailpipe without cooling) may be determined based on the desired EGR amount, which is further based on engine operating conditions such as engine load, engine speed, engine temperature etc. In one example, the controller may determine the EGR amount through a determination that directly takes into account parameters such as engine load, engine speed, engine temperature, etc. In another example, the controller may determine the EGR level based on a calculation using a look-up table with the input being one or more of engine load, engine speed, engine temperature, etc. and the output being the EGR amount.

Based on the determined ratio, the opening of the EGR valve 52 may be regulated to allow the desired amount of exhaust to enter the bypass passage 174 and the EGR delivery passage 180.

FIG. 1D shows a schematic view 160 of operation of the engine system 100 in a fourth operating mode. Components previously introduced in FIG. 1A are numbered similarly and not reintroduced.

The fourth operating mode represents a fourth setting of the diverter valve 175 and the EGR valve 52 that enables exhaust flow control. In the fourth operating mode, the diverter valve 175 may be in a second position, and the EGR valve 52 may be in the closed position. When in the fourth operating mode, due to the second (fully closed) position of the diverter valve 175, and the closed position of the EGR valve, the entire volume of exhaust exiting the second emissions control device 173 may not enter the bypass passage 174 and may flow directly to the tailpipe 35 via the muffler 172. In this operational mode there is no exhaust flow through the heat exchanger 176, and no exhaust heat recovery.

The engine system may be operated in the fourth operating mode (as described above) during higher than threshold engine load conditions and after engine and passenger cabin warm-up have been achieved. During such higher than threshold engine load conditions, higher engine power output may be desired and EGR may not be requested for engine operation. Also, since the engine and the passenger cabin warm-up has been achieved, further exhaust heat recovery may not be desired.

In this way, an engine controller may select between the first, second, third, and fourth mode of operation of the engine exhaust system based on each of engine temperature, engine load, and a fuel efficiency factor. For example, the first mode may be selected during a lower than threshold engine temperature (such as during a cold-start condition). After attainment of catalyst light-off and during engine operation with a lower than threshold engine load, a first fuel efficiency factor may be estimated based on fuel efficiency benefits achieved by operating the engine exhaust system in the second mode, and a second fuel efficiency factor may be estimated based on fuel efficiency benefits achieved by operating the engine exhaust system in the third mode. The first fuel efficiency factor may be compared to the second fuel efficiency factor, and the higher of the two fuel efficiency factors may be selected. The fourth mode may be selected after catalyst light-off in response to engine operation with a higher than threshold engine load.

The four example modes of operation of the engine exhaust system of FIGS. 1A-1D are tabulated in FIG. 5. Line 502 of table 500 shows settings corresponding to the operation of the engine exhaust system in the first mode as described in FIG. 1A, line 504 shows settings corresponding to the operation of the engine exhaust system in the second mode as described in FIG. 1B, line 506 shows settings corresponding to the operation of the engine exhaust system in the third mode as described in FIG. 1C, and line 508 shows settings corresponding to the operation of the engine exhaust system in the fourth mode as described in FIG. 1D.

FIG. 2 shows an example embodiment 200 of a coolant system 5 in a motor vehicle 6. Coolant system 5 circulates engine coolant through internal combustion engine 10 and distributes recovered heat from an exhaust heat exchanger 54 to an internal combustion engine 10 via coolant line 84. Coolant system 5 circulates engine coolant from the combustion engine 10 to heater core 90, via coolant line 89 and also to radiator 80 and/or radiator bypass line 87 via coolant line 82. Coolant flow exiting radiator 80 radiator via coolant line 82 and coolant flow bypassing the radiator via coolant line 87 may converge at a thermostat valve 38 which controls the flow split between radiator 80 and radiator bypass line 87. In one example, the coolant system 5 may be the coolant system 155 and the exhaust heat exchanger 54 may be the heat exchanger 176 in FIGS. 1A-1D.

In particular, FIG. 2 shows coolant system 5 coupled to engine 10 and circulating engine coolant from engine 10, through exhaust heat exchanger 54, and to radiator 80 and/or radiator bypass line 87 via engine-driven (or electrical) water pump 86, and back to engine 10. A first coolant line 84 may couple the engine to the heat exchanger 54. Coolant from the heat exchanger 54 may be circulated to engine 10 via the first coolant loop 84. Water pump 86 may be coupled to the engine via front end accessory drive (FEAD) 37, and rotated proportionally to engine speed via belt, chain, etc. Specifically, water pump 86 circulates coolant through passages in the engine block, head, etc., to absorb engine heat, which is then transferred via the radiator 80 to ambient air as regulated by thermostat valve 38. In an example where pump 86 is a centrifugal pump, the pressure (and resulting flow) produced may be proportional to the crankshaft speed, which may be directly proportional to engine speed. The temperature of the coolant may be regulated by a thermostat valve 38, which may be kept closed until the coolant reaches a threshold temperature, thereby reducing the transfer of heat from radiator 80 to ambient air when closed.

After flowing through the engine 10, coolant may exit the engine via a coolant line 89 and the heated engine coolant may then flow to heater core 90. After circulating through the heater core 90, the coolant returns to the engine via coolant line 89. Coolant exiting the engine via coolant line 82 may flow through the radiator 80 or through radiator bypass line 87 as regulated via the thermostat valve 38 with flow being directed through radiator bypass line 87 during conditions when the engine temperature (coolant temperature) is below a threshold temperature.

A fan 93 may be coupled to radiator 80 in order to increase airflow through radiator 80 as needed to maintain coolant temperatures below a desired threshold. In some examples, fan speed may be controlled by the engine controller directly. Alternatively, fan 93 may be coupled to the engine and driven directly from it.

The exhaust heat exchanger 54 may be used to extract heat from exhaust during cold-start conditions and when engine and/or cabin heating may be desired. In one example, an engine coolant may be circulated through the heat exchanger 54, heat from exhaust may be transferred to the engine coolant, and then the heated coolant (heated with the extracted exhaust heat) may be routed through the engine 10 via the first coolant loop 84. Coolant may then be circulated through the heater core 90 via the coolant line 89. Heat from the engine coolant may be transferred to the engine 10 and/or the heater core 90, and the engine 10 (including cylinder walls and pistons) and passenger cabin 4 may be heated using the heat drawn from the engine coolant. After flowing through the heater core, the coolant returns to the engine 10 via coolant line 89. Coolant exiting the engine via coolant line 82 may flow through the radiator 80 and/or radiator bypass line 87. After flowing through the radiator 80, the coolant returns to the engine 10 via the thermostat valve 38 while coolant bypassing the radiator via radiator bypass line 87 also returns to the engine 10 via thermostat valve 38.

Exhaust gas recirculation (EGR) system 50 may route a desired portion of exhaust gas from exhaust manifold 48 to intake manifold 44 via the exhaust heat exchanger 54 and EGR passage 59. During EGR delivery, the exhaust heat exchanger 54 may be used as an EGR cooler, and the EGR delivered to the intake manifold may be cooled at the exhaust heat exchanger 54. After cooling the EGR, the coolant may be routed to the engine 10, and then to the heater core 90, the radiator bypass line 87 and/or the radiator 80. During conditions when engine heating and/or passenger cabin heating is desired, the exhaust heat may be used to increase engine temperature and passenger cabin 4 temperature via heat transferred to the coolant via heat exchanger 54 as described before. The amount of EGR provided to intake manifold 44 may be varied by controller 12 via EGR valve 51. Further, an EGR sensor (not shown) may be arranged within EGR passage 59 and may provide an indication of one or more of pressure, temperature, and concentration of the exhaust gas.

In this way, the systems of FIGS. 1A-1D and FIG. 2 provide for an engine system, comprising: an engine intake manifold, an engine exhaust system with an exhaust passage and a bypass passage, the exhaust passage including an exhaust humidity sensor, an exhaust temperature sensor, an exhaust pressure sensor, an exhaust catalyst and a muffler, the bypass passage coupled to the exhaust passage from downstream of the catalyst to upstream of the muffler, the bypass passage including a heat exchanger, a coolant system fluidly coupled to the heat exchanger, an engine block, and a heater core, the coolant system including an engine coolant temperature sensor, a diverter valve coupled to the exhaust passage regulating exhaust flow via the bypass passage, an EGR passage with an EGR valve for recirculating exhaust from the bypass passage, downstream of the heat exchanger, to the intake manifold, and a controller with computer readable instructions stored on non-transitory memory for: estimating engine temperature via the engine coolant temperature sensor, and in response to a lower than threshold engine temperature, closing the EGR valve and shifting the diverter valve to a first position to operate the engine exhaust system in a first mode enabling exhaust flow from downstream of the catalyst to the muffler via the bypass passage and the heat exchanger, transferring heat from exhaust flowing through the heat exchanger to the coolant system, and based on an engine heating demand and a passenger cabin heating demand, transferring the heat to the engine and/or a passenger cabin via the heater core. After engine temperature is higher than the threshold engine temperature, a first fuel efficiency factor may be estimated corresponding to operating the engine exhaust system in a second mode, a second fuel efficiency factor may be estimated corresponding to operating the engine exhaust system in a third mode, the first fuel efficiency factor may be compared to the second fuel efficiency factor. In response to the first fuel efficiency factor being higher than the second fuel efficiency factor, the EGR valve may be transitioned from closed position to open position while maintaining the diverter valve in the first position to enable a first portion of exhaust to flow to the intake manifold and a second portion of exhaust to flow to the muffler via the heat exchanger, and in response to the second fuel efficiency factor being higher than the first fuel efficiency factor, the EGR valve may be transitioned from closed position to open position and the diverter valve may be transitioned from the first position to the second position to enable a third portion of exhaust to flow to the intake manifold via the heat exchanger and a fourth portion to flow to the muffler.

Figure 3:
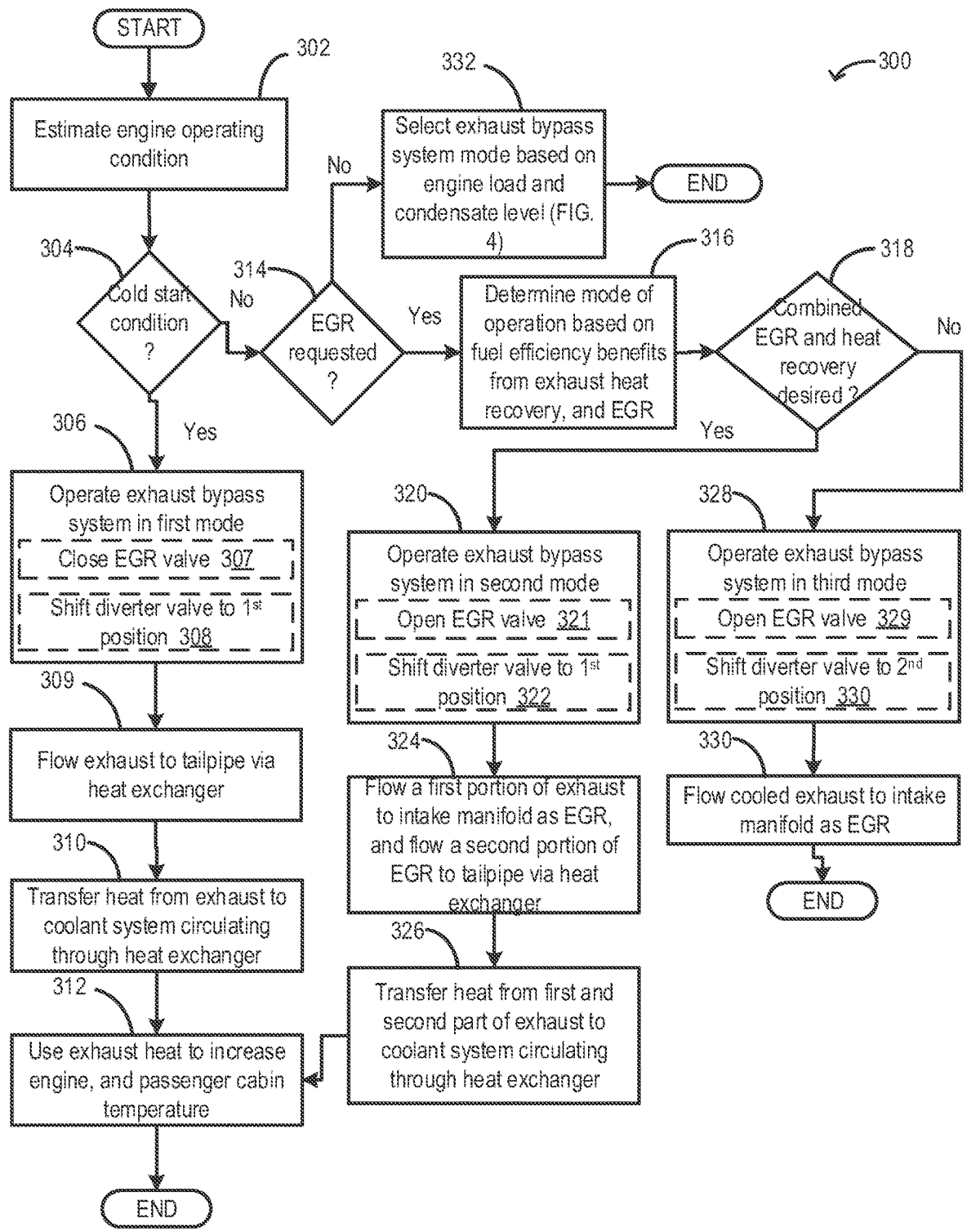
FIG. 3 shows a flow chart illustrating an example method that may be implemented for adjusting exhaust flow through the engine exhaust system of FIGS. 1A-1D.

FIG. 3 illustrates a first example method 300 that may be implemented for adjusting exhaust flow through the engine exhaust system of FIGS. 1A-1D. Instructions for carrying out method 300 and the rest of the methods included herein may be executed by a controller based on instructions stored on a memory of the controller and in conjunction with signals received from sensors of the engine system, such as the sensors described above with reference to FIGS. 1A-1D. The controller may employ engine actuators of the engine system to adjust engine operation, according to the methods described below.

At 302, the routine includes estimating and/or measuring engine operating conditions. Conditions assessed may include, for example, engine temperature, engine load, engine speed, throttle position, exhaust pressure, exhaust air/fuel ratio, etc.

At 304, the routine includes confirming an engine cold-start condition. An engine cold-start condition may be confirmed when the engine is started after a prolonged period of engine inactivity while the engine temperature is lower than a threshold (such as below an exhaust catalyst light-off temperature), and while ambient temperatures are below a threshold. During cold-start conditions, expedited engine heating may be desired to reduce cold-start emissions. Additionally, passenger cabin heating may be desired by a vehicle operator. Furthermore, during an engine cold-start, exhaust gas recirculation (EGR) may not be desired.

If engine cold-start conditions are confirmed, the routine moves to 306 in order to operate the engine exhaust system in the first operating mode. Operating in the first mode, as described in relation to FIG. 1A, includes at 307, actuating the EGR valve (such as EGR valve 52 in FIG. 1A) to a closed position, and at 308, shifting the diverter valve (such as diverter valve 175 in FIG. 1A) coupled to a junction of the bypass passage (such as bypass passage 174 in FIG. 1A) and the main exhaust passage to a first position (herein also referred to as the fully open diverter valve position) that diverts exhaust flow into the bypass passage.

Due to the first position of the diverter valve, at 309, the entire volume of exhaust exiting the catalyst may enter the bypass passage from the main exhaust passage, and flow through a heat exchanger (such as heat exchanger 176 in FIG. 1A) housed in the bypass passage. Due to the closed position of the EGR valve, exhaust flow from the exhaust passage to the engine intake manifold via the EGR passage may be disabled. Consequently, after passing through the heat exchanger, the exhaust may return to the main exhaust passage, upstream of a muffler, via the diverter valve.

At 312, during exhaust flow through the heat exchanger, exhaust heat may be recovered at the heat exchanger. Specifically, heat from the exhaust may be transferred to a coolant circulating through the heat exchanger. By transferring the heat from the exhaust to the coolant, at a location downstream of the exhaust catalyst, a bulk of the exhaust heat can be used to warm (and thereby activate) the exhaust catalyst, while the exhaust heat remaining after heating the exhaust catalyst can be advantageously used to expedite engine heating. In particular, the remaining exhaust heat can be used to warm the coolant circulating through the heat exchanger, and the warmed coolant an then be circulated through the engine and/or through a heater core so that the heat can be utilized for heating other components of the vehicle system. For example, if cabin heating is requested by the vehicle operator due to the vehicle cabin temperature being lower than a desired temperature at the cold-start, warmed coolant may be circulated through the heater core and cabin heating may be provided. Thus, based on cabin heating demands, as requested by a vehicle operator (e.g., based on a cabin temperature setting), heat may be transferred from the heater core to the cabin. For example, air may be drawn into the cabin via the heater core, thereby enabling the cabin to be warmed. The warmed coolant may also be circulated to an engine block and cylinder head to raise engine temperatures, thereby improving engine performance during cold conditions.

If it is determined that cold-start conditions are not prevalent, at 314, the routine includes determining if EGR is requested for engine operations. EGR may be desired after the exhaust catalyst(s) have attained their respective light-off temperature(s), and are optimally functional. EGR may be requested to attain a desired engine dilution, thereby improving fuel efficiency and emissions quality. An amount of EGR requested may be based on engine operating conditions including engine load, engine speed, engine temperature, etc. For example, the controller may refer to a look-up table having the engine speed and load as the input, and having a signal corresponding to a degree of opening to apply to the EGR valve as the output, the degree of opening providing a dilution amount corresponding to the input engine speed-load. In still other examples, the controller may rely on a model that correlates the change in engine load with a change in the engine's dilution requirement, and further correlates the change in the engine's dilution requirement with a change in the EGR requirement. For example, as engine load increases from a low load to a mid-load, EGR requirement may increase, and then as engine load increases from a mid-load to a high load, EGR requirement may decrease.

If it is determined that EGR is requested for engine operation (such as at low-mid load regions), at 316, engine heating demands may be determined and engine dilution demand may be retrieved. As discussed above, the engine dilution demand refers to an amount of EGR requested in the engine. The engine heating demand may refer to an amount of engine heating required to maintain cylinder walls and pistons at a temperature where fuel vaporization is improved and soot emissions are reduced. Engine heating demands may further include cabin heating demands as requested by a vehicle operator. As such, the engine heating is provided by warmed coolant being circulated through the engine block and the heater core.

A mode of operation of the exhaust system may be selected based on a comparison of fuel efficiency benefits from exhaust heat recovery and EGR usage. During a demand for EGR, the engine exhaust system may be operated in either the second mode or the third mode. During both the second and third modes, an opening of the EGR valve is adjusted based on the EGR demand to recirculate a first portion of exhaust to the engine intake, wherein during the second mode, a second, remaining portion of exhaust flows to the tailpipe via the heat exchanger, and wherein during the third mode, the second portion of exhaust flows directly to the tailpipe, bypassing the heat exchanger.

As elaborated herein, when EGR is demanded in addition to engine heating, the exhaust system may be operated in a mode where the heat exchanger functions both as a heat exchanger for exhaust heat recovery as well as an EGR cooler. Therein, in order to improve fuel efficiency, exhaust heat may be retrieved for heating vehicle components while simultaneously recirculating partially cooled exhaust for engine operations while operating the exhaust system in a combined exhaust heat recovery and EGR mode (second mode). However, during the combined exhaust heat recovery and EGR mode, due to the large volume of exhaust flowing through the heat exchanger, the exhaust may not be completely cooled before delivery to the engine intake manifold, resulting in a partially cooled EGR. During conditions when EGR is demanded, even if engine heating is not explicitly demanded (such as when the engine is sufficiently warm), the controller may compare the efficiency of providing the EGR as a cooler EGR with no concurrent exhaust heat recovery, or as a partially cooled EGR with concurrent exhaust heat recovery. As one example, a partially cooled EGR may be suitable during conditions when charge heating is desired (for combustion) to improve engine performance and emissions level, such as when the engine uses a higher ratio of port injection of fuel relative to direct injection of fuel. As another example, a partially cooled EGR may be suitable during a higher than threshold ambient humidity condition so that condensate formation at the heat exchanger can be reduced. Alternatively, if the fuel efficiency of providing the cooled EGR is higher, the EGR may be provided by operating the exhaust system in an EGR only mode (third mode) wherein cooled EGR is delivered to the intake manifold. While operating in the third mode, exhaust heat recovered by the coolant during EGR cooling may also be used for engine and/or cabin heating. In one example, operation in the second mode includes operating with a higher amount of port injection relative to direct injection, and operation in the third mode includes operating with a lower amount of port injection relative to direct injection. The temperature of the EGR recirculated to an engine intake during the second mode is higher than the temperature of the EGR recirculated to the engine intake during the third mode. As such, the second mode may be selected when the EGR demand is received at a lower engine temperature, and the third mode may be selected when the EGR demand is received at a higher engine temperature. During the second mode, a coolant may be circulated through the heat exchanger, and heat from each of the first portion and the second portion of exhaust may be transferred to the coolant, and heat from the coolant may be transferred to an engine block based on the engine heating demand; and during the third mode, the coolant may be circulated through the heat exchanger, and heat from only the first portion of exhaust may be transferred to the coolant, and heat from the coolant may also be transferred to the engine block.

A first fuel efficiency factor may be estimated based on a fuel efficiency benefit from providing cooler EGR with lower exhaust heat recovery. A second fuel efficiency factor may be estimated based on a fuel efficiency benefit from providing partially cooled EGR, and a higher exhaust heat recovery (to be used for engine heating, passenger cabin heating etc.) Since in the second mode, a higher amount of exhaust flows through the heat exchanger, exhaust heat recovery is higher compared to the third mode when a smaller amount of exhaust (EGR) flows through the heat exchanger. The controller may determine the fuel efficiency factors through a determination that directly takes into account the fuel efficiency benefit achieved from each of EGR and exhaust heat recovery. The controller may alternatively determine the fuel efficiency factors based on a calculation using a look-up table with the input being the fuel efficiency benefits achieved from each of EGR, and exhaust heat recovery and the output being the fuel efficiency factor.

The first and the second fuel efficiency factors may be compared and the operating mode having the higher efficiency factor may be selected. As one example, the controller may make a logical determination (e.g., regarding the determination of the operating mode) based on logic rules that are a function of the fuel efficiency factor. In one example, even during demand for exhaust heat recovery, if it is determined that a higher fuel efficiency benefit may be achieved by providing cooler EGR with lower exhaust heat recovery, the controller may operate the exhaust system in the EGR mode while using the recovered heat along with an inherent engine heat and one or more supplemental heaters for engine and/or passenger cabin heating.

At 318, the routine includes determining if combined EGR and exhaust heat recovery is desired based on engine operating conditions and fuel efficiency benefits. Combined heat recovery and EGR may be selected if the second fuel efficiency factor is higher than the first fuel efficiency factor. Alternatively, combined heat recovery and EGR may be selected if there is an EGR demand and a concurrent engine heating or cabin heating demand.

If it is determined that both EGR delivery and exhaust heat recovery is desired, the routine moves to 320 in order to operate the exhaust system in the second operating mode. Operating in the second mode, as described in relation to FIG. 1B, includes at 321, actuating the EGR valve to an open position, and at 322, actuating the diverter valve to a first position where concurrent exhaust flow to the intake manifold (as EGR) and to the tailpipe via the heat exchanger is enabled. A degree of opening of the EGR valve is adjusted based on the amount of EGR desired, the EGR valve opening increased as the amount of EGR desired increases.

Due to the first position of the diverter valve, at 324, the entire volume of exhaust may enter the bypass passage from the main exhaust passage, and flow through the heat exchanger. Upon exiting the heat exchanger, due to the opening of the EGR valve, a first portion of the exhaust may enter the EGR delivery passage to be delivered to the engine intake passage via the EGR valve, and a second portion of the exhaust may return to the main exhaust passage via the diverter valve. After reentering the main exhaust passage, the second portion of the exhaust may flow through a muffler, and exit to the atmosphere. As the entire volume of exhaust flows through the heat exchanger, the EGR delivered to the intake passage (as the first portion) may be partially cooled. During operation in the second mode, a ratio of the first portion to the second portion may be based on the amount of EGR desired. In one example, the first portion may be increased as the amount of EGR desired increases, and the second portion may be correspondingly decreased.

At 326, heat from the hot exhaust may be transferred to a coolant circulating through the heat exchanger. The warmed coolant may be circulated back to the engine for further engine warm-up and/or the retrieved heat may be transferred to the heater core for heating a passenger cabin of the vehicle based on cabin heating demand.

If it is determined (at 318) that combined EGR and exhaust heat recovery is not desired, it may be inferred that cooled EGR delivery without exhaust heat recovery may be desired for engine operations and the routine may proceed to step 328. In one example, cooled EGR delivery without exhaust heat recovery may be desired if the first fuel efficiency factor (as estimated in 316) is higher than the second fuel efficiency factor. In another example, cooled EGR delivery without exhaust heat recovery may be desired during conditions when EGR is required and engine heating demands are already met. At 328, the exhaust system may be operated in the third operating mode. Operating in the third mode, as described in relation to FIG. 1C, includes at 329, actuating the EGR valve to an open position, and at 330, actuating the diverter valve to a second position to enable a desired amount of exhaust flow from the main exhaust passage to the intake passage via the heat exchanger. A degree of opening of the EGR valve may be adjusted based on the amount of EGR desired.

Due to the second position of the diverter valve, at 330, a first portion of exhaust may enter the bypass passage from the main exhaust passage, and flow through the heat exchanger but may not return to the main exhaust passage via the diverter valve. Upon exiting the heat exchanger, due to the opening of the EGR valve, the first portion of exhaust may enter the EGR delivery passage to be delivered to the engine intake passage via the EGR valve. A second (remaining) portion of exhaust may not enter the bypass passage but may flow directly to the tailpipe via the main exhaust passage. The EGR delivered to the intake passage may be cooled at the heat exchanger. Since only a fraction of the exhaust flows through the heat exchanger in this mode, the exhaust is cooled to a larger extent, resulting in a cooler EGR. The heat recovered from the EGR flowing through the heat exchanger may be used for engine heating and/or cabin heating based on engine heating and cabin heating demands. The ratio of the first portion of exhaust (delivered as EGR) to the second portion of exhaust (directly routed to tailpipe without cooling) may be determined based on the EGR demand. Based on the determined ratio, the opening of the EGR valve may be regulated to allow the desired amount of exhaust to enter the bypass passage and thereon to the EGR delivery passage.

If it is determined (at 314) that EGR is not desired for engine operation, the exhaust system may be operated in one of a fourth mode and a first mode. At 332, the operating mode may be selected based on engine operating conditions including each of an engine load and a condensate level in the heat exchanger. As exhaust flows through the heat exchanger, water from the hot exhaust may condense at the heat exchanger, and the condensate may be opportunistically purged so that water does not get ingested into the engine causing combustion instability. In one example, when the condensate level is higher than a threshold level, the first mode is selected to enable rapid purging of condensate to the tailpipe. Else, when the engine load is higher than a threshold engine load, even if the condensate level is lower than the threshold, a fourth mode is selected. Details of the selection of the operational mode of the exhaust system are further discussed at FIG. 4.

Figure 4:
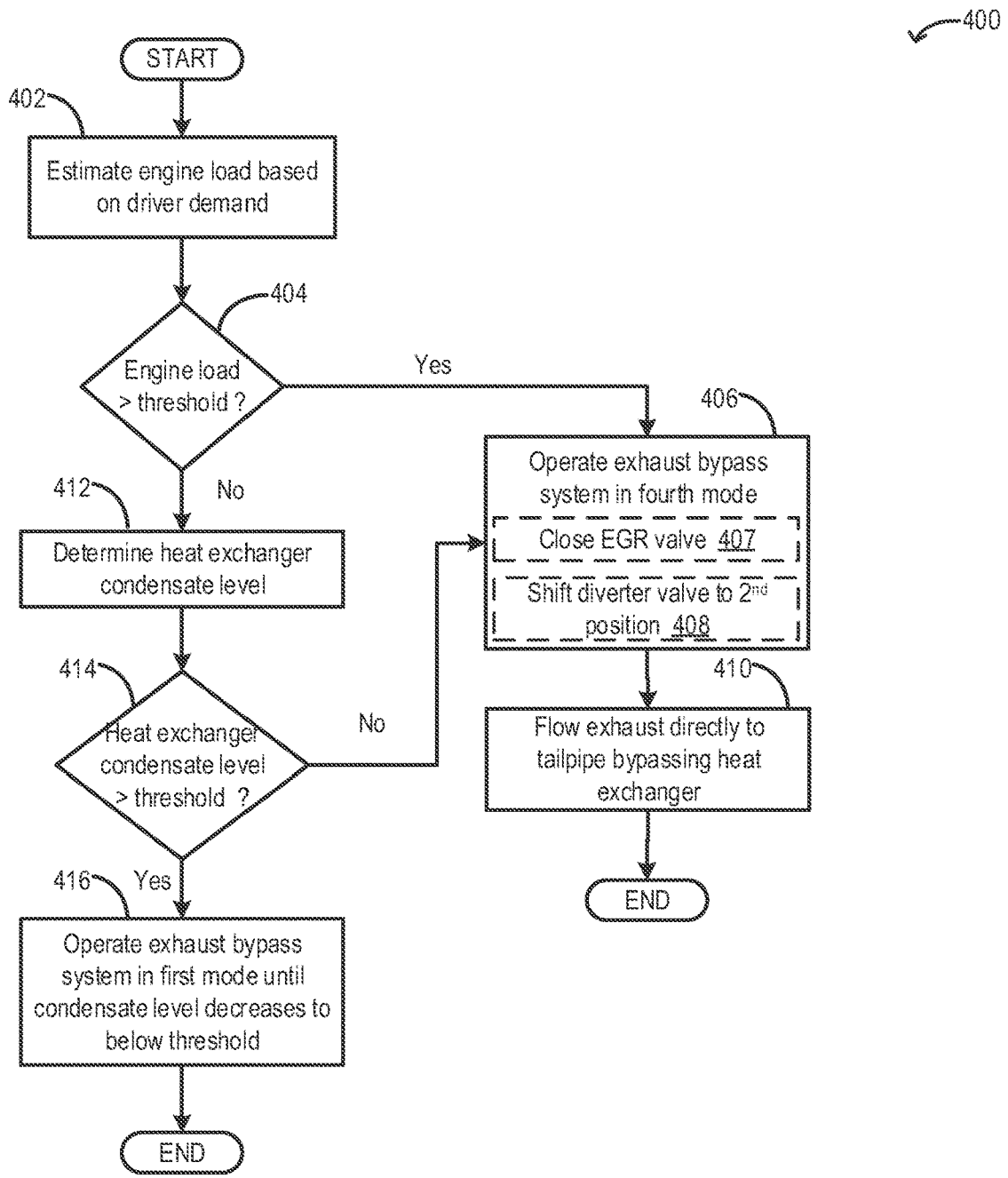
FIG. 4 shows a flow chart illustrating a continuation of the example method of FIG. 3 that may be implemented for further adjusting exhaust flow through the engine exhaust system of FIGS. 1A-1D.

FIG. 4 illustrates an example method 400 that may be implemented for further adjusting exhaust flow through the engine exhaust system of FIGS. 1A-1D. The method 400 is a continuation of method 300 of FIG. 3 and may be carried out at step 332 of FIG. 3.

At 402, engine load may be estimated based on driver demand. Driver demand may be determined based on an input from the pedal position sensor. In one example, the controller may estimate the engine load through a determination that directly takes into account a determined driver demand, such as increasing the engine load with increasing driver demand. The controller may alternatively estimate the engine load based on a calculation using a look-up table with the input being pedal position and the output being engine load. At 404, the routine includes determining if the current engine load is higher than a threshold load. The threshold engine load may correspond to the load above which a higher engine power is desired and exhaust gas recirculation (EGR) may not be required. At higher engine loads, the engine dilution demand is lower. During such conditions, EGR delivery can lead to combustion instability and decreased engine power.

If it is determined that the engine load is higher than the threshold load, at 406, the exhaust system may be operated in a fourth operating mode. Operating in the fourth mode, as described in relation to FIG. 1D, includes at 407, actuating the EGR valve to a fully closed position, and at 408, actuating the diverter valve to the second position where direct exhaust flow via the main exhaust passage is enabled.

Due to the second position of the diverter valve, and the closed positon of the EGR valve, the exhaust flowing through the exhaust passage may not enter the bypass passage and may flow directly to the tailpipe via the muffler. In this operational mode, there is no exhaust flow through the heat exchanger, and exhaust heat may not be recovered. Also, EGR is not delivered while operating the exhaust system in this fourth mode.

If it is determined that engine load is lower than the threshold engine load, at 412, the level of condensate accumulated in the heat exchanger may be estimated. Also, the condensate level in a designated condensate collecting region in the EGR delivery passage may be estimated. In one example, the condensate level may be directly estimated by the controller based on inputs from exhaust system sensors including humidity, temperature, and pressure sensors, such as by using a model or algorithm that uses the sensor inputs as input parameters. In another example, the condensate level may be determined using a look-up table wherein exhaust system humidity, exhaust temperature, and exhaust pressure may be used as input, and the condensate level may be the output. As such, the condensate level at the heat exchanger may increase with an increase in the ambient humidity, a decrease in exhaust temperature, and a decrease in exhaust pressure at the heat exchanger. In yet another example, an estimate of the rate of condensate formation may be determined based on exhaust flow rate and coolant temperature at the heat exchanger, and a condensate level may be computed from the rate of condensate formation. The condensate level may increase with an increase in the rate of condensate formation which in turn may be caused due to an increase in exhaust flow rate and a decrease in coolant temperature.

At 414, the routine includes determining if the condensate level is higher than a threshold condensate level. The threshold condensate level may correspond to a level above which water may enter the combustion chamber and cause misfires and combustion instability. If it is determined that the condensate level in the heat exchanger is higher than the threshold level, at 414, the exhaust system may be operated in the first mode with the diverter valve in the first position where exhaust flow through the heat exchanger is enabled, and the EGR valve closed. Due to the position of the valves, the entire volume of hot exhaust may enter the bypass passage and flow through the heat exchanger. As exhaust flows through the heat exchanger, the hot exhaust may purge the accumulated condensate to the atmosphere via the tailpipe. The exhaust system may be operated in this mode until the condensate level in the heat exchanger decreases to below the threshold level.

Alternatively, the condensate may be purged opportunistically when the engine is operating unfueled, such as during a deceleration fuel shut-off event or an electric mode of operation when the vehicle is a hybrid vehicle. Therein, the controller may fully open the EGR valve to route the condensate into the engine intake manifold, and the condensate may evaporate upon entering the warm engine. This method of purging to the engine intake manifold may be carried out upon confirmation that the engine is warm, and the engine load is lower than the threshold load. Estimation of condensate level at the heat exchanger, followed by the purging process (as required) may be carried out throughout the duration of engine operation in order to reduce the possibility of the condensate entering the engine intake manifold during fueled engine operation.

If at 414 it is determined that the heat exchanger condensate level is lower than the threshold level, the routine may proceed to step 406 to operate the exhaust system in the fourth mode. In the fourth mode, exhaust may not enter the bypass passage and may directly flow to the tailpipe.

In this way, during an engine cold-start, an engine exhaust system may be operated in a first mode by closing an exhaust gas recirculation (EGR) valve, and actuating a diverter valve to a first position to enable exhaust flow to a tailpipe via a heat exchanger in a bypass passage; heat from exhaust may be transferred to a coolant circulating through the heat exchanger; and the coolant may be circulated through the engine and a heater core to increase one or more of engine temperature and vehicle cabin temperature; and after catalyst light-off, one of a second mode of operation with the EGR valve open and the diverter valve in the first position and a third mode of operation with the EGR valve open and the diverter valve in a second position may be selected, the selecting based on EGR demand relative to engine and cabin heating demands.

FIG. 6 shows an example operating sequence 600 illustrating operation of the engine exhaust system of FIGS. 1A-1D. Exhaust flow through the bypass passage may be determined based on engine operating conditions and exhaust gas recirculation (EGR) demands relative to heating demands. The horizontal (x-axis) denotes time and the vertical markers t1-t6 identify significant times in the operation of the engine exhaust system.

The first plot, line 602, shows variation in engine load over time. The dotted line 603 denotes a threshold engine load. The second plot, line 604, shows change in engine temperature as estimated via an engine coolant temperature sensor over time. The third plot, line 606, shows passenger cabin temperature as estimated via a temperature sensor coupled to the passenger cabin. The fourth plot, line 608, shows EGR delivered to the engine for desired combustion and emissions control performance. Dotted line 609 shows a desired EGR level as determined based on factors including engine load, engine speed, engine temperature, heat exchanger condensate level, etc. The fifth plot, line 610, shows a level of condensate accumulated in the exhaust system heat exchanger. Dotted line 611 shows a threshold level of condensate above which purging of the condensate is required to maintain engine combustion stability. The sixth plot, line 612, shows a position of the EGR valve. The seventh plot, line 614, shows a position of a diverter valve coupled to a junction of the main exhaust passage and the bypass passage, downstream of a heat exchanger.

Prior to time t1, the engine is inactive and the vehicle is not propelled using engine torque. At time t1, in response to an operator request, the engine starts from rest after a period of inactivity. At engine start, the engine temperature may be lower than the threshold temperature 605. Based on the lower than threshold engine temperature, engine cold-start conditions are inferred. Due to the lower than threshold engine temperature at the cold-start, heating of engine components such as the cylinder head, cylinder walls, pistons etc., may be desired to reduce cold-start emissions. As the vehicle starts up, passenger cabin heating may also be requested by the operator. During engine start conditions, EGR may not be desired for engine operations, therefore the EGR valve may be maintained in the closed position, and exhaust may not flow from the exhaust passage to the engine intake manifold.

Responsive to the engine cold-start condition, while the engine is cranked and fueled and cylinder combustion is started, the diverter valve may be shifted to a first position (more open position) to enable exhaust from the main exhaust passage to be diverted into the bypass passage. Exhaust may then flow through the heat exchanger coupled to the bypass passage before being returned to the main passage, upstream of a muffler. After flowing through the heat exchanger, the exhaust may not enter the EGR delivery passage but may return to the main exhaust passage to exit to the atmosphere via a muffler and a tailpipe. As the exhaust flows through the heat exchanger, heat from the exhaust may be transferred to a coolant circulating through the heat exchanger which results in coolant warming.

Responsive to the engine/cabin heating demand, between t1 and t2, the heat recovered from the exhaust at the heat exchanger may be utilized for meeting the heating demand. Coolant heated upon circulation through the heat exchanger may be further circulated through the engine block, and around cylinder walls and pistons to expedite engine heating. Also, heated coolant may be circulated through the vehicle heater core to heat the cabin.

Due to exhaust heat recovery at the heat exchanger and circulation of heated coolant around the engine block, between t1 and t2, the engine temperature may rise. Also, inherent heat generation at the engine may cause engine temperature to increase while the recovered exhaust heat may accelerate the engine warm-up. At t2, the engine temperature may increase to above threshold temperature 605 and further engine heating may not be required. However, cabin heating may still be required. Also, due to a change in engine load from low load to mid-load conditions, EGR may be requested. During this time, a partially cooled EGR may be more fuel efficient. A partially cooled EGR may be requested during conditions when a higher temperature air fuel mixture is desired (for combustion) to improve engine performance and emissions level. As an example, a partially cooled EGR may be requested during use of port injection. Also, a partially cooled EGR may be requested during a higher than threshold ambient humidity condition such that condensate formation at the heat exchanger may be reduced. Therefore in order to provide a partially cooled EGR, and simultaneously extract heat from exhaust for cabin heating, the EGR valve may be opened, while the diverter valve is maintained in the first position.

Between time t2 and t3, due to the position of the valves, a first portion of partially cooled exhaust may flow to the intake manifold as EGR, and a second, remaining portion of exhaust may flow to the tailpipe, via the heat exchanger. Herein, the first portion is smaller than the second portion. During this time, the heat exchanger may be used as an EGR cooler and the EGR delivered to the engine may be partially cooled. Heat from the exhaust may be transferred to a coolant circulating through the heat exchanger, and the heat extracted from the exhaust may be further used for each of engine warm-up, and passenger cabin warm-up. The ratio of the first portion of exhaust routed to the intake manifold to the second portion of exhaust routed back to the exhaust manifold is based on the amount of dilution requested. The opening of the EGR valve is also adjusted based on the amount of EGR requested.

At time t3, responsive to a decrease in engine load (such as due to an operator pedal tip-out), a higher amount of EGR may be requested. In response to the increase in the amount of EGR requested, the opening of the EGR valve may be increased to enable flow of a higher amount of exhaust from the exhaust manifold to the intake manifold via the heat exchanger and the EGR delivery passage. Correspondingly, the amount of exhaust returning to the main exhaust passage after flowing through the heat exchanger may be reduced.

As exhaust flows through the heat exchanger between t2 and t4, water from the exhaust may condense at the heat exchanger, and the level of the accumulated condensate may gradually increase.

At time t4, the engine load may decrease further and a higher amount of cold EGR may be desired for optimal performance and emissions quality. Also, at this time, further heating of the cabin may not be requested. Therefore, exhaust heat recovery may no longer be required. The controller may calculate that flowing of the entire volume of exhaust through the heat exchanger is less efficient than flowing only a portion of exhaust through the heat exchanger, so that the exhaust may be cooled to a greater extent. Therefore between time t4 and t5, instead of flowing the entire volume of exhaust through the bypass passage, the diverter valve may be shifted to a second position (more closed position) to flow a desired amount of exhaust to the intake manifold via the heat exchanger. Due to the second position of the diverter valve, exhaust entering the bypass passage may not return to the main exhaust passage and may flow to the intake manifold via the EGR delivery passage and the EGR valve. The opening of the EGR valve may be increased to enable flow of the higher amount of cold EGR to the intake manifold. The remaining exhaust may be routed to exit to the atmosphere directly via the tailpipe without entering the bypass passage. The ratio of the first portion of exhaust entering the bypass passage to be delivered as EGR to the second portion of exhaust directly flowing to the tailpipe may be adjusted based on the amount of EGR desired, the first portion increased with an increase in the amount of EGR desired.

At time t5, the engine load may increase to above the threshold load due to a higher engine power output being requested (such as due to an operator tip-in). At the increased engine load, EGR may no longer be desired. At this time, each of the engine temperature, and the cabin temperature is above the respective threshold, and exhaust heat recovery may no longer be requested. Therefore, in order to route the exhaust directly through the exhaust passage, the diverter valve may be shifted to the second position and the EGR valve may be closed. Also at time t5, the condensate level at the heat exchanger may increase to above the threshold level, and purging of the condensate accumulated at the heat exchanger may be desired. In view of an upcoming engine shutdown request, the controller may delay the purging of the condensate to opportunistically overlap with the engine shutdown. Between time t5 and t6, exhaust may not enter the bypass passage or the EGR delivery passage, and instead may be directly released to the atmosphere via the tailpipe.

At time t6, an engine shut-down request may be received from the operator. At this time, the condensate accumulated in the heat exchanger may be opportunistically purged. In order to remove the condensate, after shutting off fuel to the engine, and while the engine spins to rest, the controller may actuate the diverter valve to the first position while maintaining the EGR valve in the closed position. Due to the first position of the diverter valve, during the engine shutdown, the entire amount of hot exhaust may be routed from the exhaust manifold to the tailpipe via the heat exchanger wherein the accumulated condensate may be purged by the hot exhaust to the atmosphere via the tailpipe. In one example, the condensate may vaporize upon contacting the hot exhaust, and the water vapor may be removed by the exhaust flow. By removing the accumulated condensate before the engine shutdown is completed, the possibility of condensate freezing in the heat exchanger (which may cause damage to heat exchanger components) may be reduced. Between time t6 and t7, the engine may remain shut-down.

At time t7, an engine restart request is received responsive to which the engine starts from rest. Herein the engine is restarted after a shorter duration since a last shutdown, therefore an engine hot-start is inferred with engine temperature above the threshold temperature 605. At this time, cabin heating may be requested by the operator. Therefore, the exhaust may be routed via the heat exchanger wherein the exhaust heat may be extracted by a coolant which may then circulate through the heater core in order to provide heat to the passenger cabin. In order to circulate the exhaust through the heat exchanger, the diverter valve may be actuated to the first position. During the hot-start condition, EGR may not be desired for engine operations and the EGR valve may be maintained in the closed position. After time t7, due to the position of the valves, the entire volume of exhaust may enter the bypass passage, and flow through the heat exchanger, and then may be returned to the main exhaust passage from where the exhaust may be released to the atmosphere via the tailpipe. The heat recovered from the exhaust may be directly used for providing heat to the passenger cabin, thereby reducing the demand for increasing engine temperature (heat) for cabin heating purposes. In this way, engine operation solely for the purposes of providing engine heat may be reduced which may thereby reduce the overall usage of any available supplemental heater.

In this way, a single heat exchanger coupled to an exhaust bypass passage may be effectively used for cooling EGR and for extracting heat from the exhaust gas for the purposes of engine and cabin heating. By using a single heat exchanger system, cost and component reduction benefits are achieved without limiting the functionality or capability of either system. By simultaneously providing EGR and recovering exhaust heat for use in providing heat to the engine, and/or passenger cabin, fuel efficiency benefits may be maximized while improving emissions quality. By utilizing exhaust heat to expedite cylinder walls and pistons heating during cold-start conditions, cold-start emissions may be reduced. The technical effect of periodic removal of the condensate accumulated in the heat exchanger to the atmosphere is that undesired water ingestion into the cylinders, which may cause misfire events, may be reduced. Also, by opportunistically purging the condensate to the engine intake manifold, the condensate may be vaporized without affecting combustion stability. Overall, by improving the amount of waste heat that can be recovered from exhaust using fewer components while concurrently providing EGR, engine fuel economy, and performance may be improved.

An example engine method comprises: during an engine cold-start, operating an exhaust system in a mode with exhaust flowing to a tailpipe via a heat exchanger coupled in a bypass passage; and after the engine cold-start, operating the exhaust system in another mode with exhaust recirculating through a recirculation passage to an intake manifold via the heat exchanger, the recirculation passage coupled to the bypass passage downstream of the heat exchanger. In the preceding example, additionally or optionally, the method further comprises, while operating in each of the mode and the another mode, circulating an engine coolant through the heat exchanger to transfer heat from the exhaust flowing through the heat exchanger to the circulating engine coolant. In any or all of the preceding examples, additionally or optionally, the method further comprises, after transferring heat to the engine coolant, flowing the engine coolant through one or more of the engine, a heater core, and a radiator to transfer the heat from the engine coolant to one or more of the engine, the heater core, and the radiator, wherein heat is drawn from the circulating engine coolant as a function of engine heating demand and a cabin heating demand. In any or all of the preceding examples, additionally or optionally, the method further comprises transitioning from the mode to the another mode based at least on engine temperature being higher than a threshold engine temperature. In any or all of the preceding examples, additionally or optionally, the method further comprises transitioning from the mode to the another mode based on engine load being lower than a threshold engine load. In any or all of the preceding examples, additionally or optionally, the bypass passage is arranged parallel to a main exhaust passage, and wherein the bypass passage is coupled to the main exhaust passage, downstream of one or more exhaust catalysts. In any or all of the preceding examples, additionally or optionally, the method further comprises, during the mode, actuating a diverter valve coupling the bypass passage and the main exhaust passage to a first position, and during the another mode, actuating the diverter valve to a second, different position. In any or all of the preceding examples, additionally or optionally, the method further comprises, during the mode, actuating an EGR valve coupled to the recirculation passage closed, and during the another mode, actuating the EGR valve open. In any or all of the preceding examples, additionally or optionally, the first position of the diverter valve is a fully open position that enables exhaust to be routed to the tailpipe via the bypass passage, and wherein the second position of the diverter valve is a fully closed position which disables exhaust flow to the tailpipe via the bypass passage. In any or all of the preceding examples, additionally or optionally, the method further comprises, responsive to exhaust pressure, operating the exhaust system in a further mode with a first portion of the exhaust flowing to the tailpipe via the heat exchanger and second, remaining portion of the exhaust flowing to the intake manifold through the recirculation passage via the heat exchanger. In any or all of the preceding examples, additionally or optionally, a ratio of the first portion to the second portion is further based on EGR demand, and wherein during the further mode, the diverter valve is in between the first and second position.

Another example engine system coupled to a vehicle comprises: an engine intake manifold; an exhaust passage including one or more catalysts and a diverter valve, the exhaust passage leading to a tailpipe; a bypass passage coupled to the exhaust passage from downstream of the catalyst to upstream of the tailpipe, the bypass passage including a heat exchanger; a coolant system including coolant lines for circulating coolant into and out of the heat exchanger, the heat exchanger fluidically coupling the heat exchanger to an engine block and a heater core; a temperature sensor for sensing engine coolant temperature; an exhaust gas recirculation (EGR) passage with an EGR valve for recirculating exhaust gas from downstream of the heat exchanger to the engine intake manifold; and a controller with computer readable instructions stored on non-transitory memory that when executed cause the controller to: estimate engine temperature via the temperature sensor; and in response to a lower than threshold engine temperature, close the EGR valve and shift the diverter valve to a first position to operate the engine exhaust system in a first mode enabling exhaust flow from downstream of the catalyst to the tailpipe via the bypass passage and the heat exchanger; and after engine temperature is higher than the threshold engine temperature, transition the EGR valve from the closed position to an open position and the diverter valve from the first position to a second position to operate the engine exhaust system in a second mode enabling exhaust recirculation from downstream of the catalyst to the engine intake manifold via the heat exchanger. In any or all of the preceding examples, additionally or optionally, the controller includes further instructions for, after engine temperature is higher than the threshold engine temperature, and responsive to exhaust pressure, transition the EGR valve from the closed position to the open position and the diverter valve from the first position to a position in-between the first position and the second position to operate the engine exhaust system in a third mode enabling exhaust recirculation from downstream of the catalyst to the engine intake manifold via the heat exchanger concurrent to exhaust flow from downstream of the catalyst to the tailpipe via the bypass passage and the heat exchanger. In any or all of the preceding examples, additionally or optionally, the position in-between the first position and the second position is based on the exhaust pressure. In any or all of the preceding examples, additionally or optionally, the controller includes further instructions for: in each of the first, second, and third mode, circulate coolant though the heat exchanger to transfer heat from exhaust flowing through the heat exchanger to the coolant system. In any or all of the preceding examples, additionally or optionally, the controller includes further instructions for: based on an engine heating demand and a passenger cabin heating demand, transfer the heat to the engine and/or a passenger cabin via the heater core.

Another example system for a vehicle comprises: a main exhaust passage including an exhaust catalyst and a diverter valve; a bypass passage housing a heat exchanger, the bypass passage coupled to the main exhaust passage downstream of the exhaust catalyst; a exhaust gas recirculation (EGR) passage including an EGR valve for flowing exhaust gas from downstream of the heat exchanger to an engine intake manifold; a coolant system including distinct coolant lines for circulating coolant into and out of the heat exchanger; an engine temperature sensor; an exhaust pressure sensor; and a controller with computer-readable instructions stored on non-transitory memory for: when engine temperature is lower than a threshold, operate in a first mode with the EGR valve closed and the diverter valve in a first position, the first mode enabling exhaust flow from downstream of the catalyst to the tailpipe via the bypass passage and the heat exchanger; after engine temperature is higher than the threshold engine temperature, selecting between operating in a second mode or a third mode based on exhaust pressure, the second mode including the EGR valve transitioned from the closed position to an open position and the diverter valve transitioned from the first position to a second position, the third mode including the EGR valve transitioned from the closed position to the open position and the diverter valve transitioned from the first position to another position in-between the first and second position; and during all modes, circulating coolant through the heat exchanger. In any or all of the preceding examples, additionally or optionally, operating in the second mode enables exhaust recirculation from downstream of the catalyst to the engine intake manifold via the EGR passage and the heat exchanger. In any or all of the preceding examples, additionally or optionally, operating in the third mode enables a portion of exhaust to be flowed to the tailpipe via the heat exchanger and another, remaining portion of exhaust to be recirculated from downstream of the catalyst to the engine intake manifold via the EGR passage and the heat exchanger. In any or all of the preceding examples, additionally or optionally, the controller includes further instructions for, after circulating coolant through the heat exchanger, flowing heated coolant through an engine block and a heater core based on engine heating demand relative to vehicle cabin heating demand.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types as well as various hybrid electric vehicles types including conventional hybrids and plug-in hybrids. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
during an engine cold-start, operating an exhaust system in a mode with exhaust flowing to a tailpipe via a heat exchanger coupled in a bypass passage; and
after the engine cold-start, operating the exhaust system in another mode with exhaust recirculating through a recirculation passage to an intake manifold via the heat exchanger, the recirculation passage coupled to the bypass passage downstream of the heat exchanger;
transitioning from the mode to the another mode based at least on engine temperature being higher than a threshold engine temperature; and
transitioning from the mode to the another mode based on engine load being lower than a threshold engine load.

2. The method of claim 1, further comprising, while operating in each of the mode and the another mode, circulating an engine coolant through the heat exchanger to transfer heat from the exhaust flowing through the heat exchanger to the circulating engine coolant.

3. The method of claim 2, further comprising, after transferring heat to the engine coolant, flowing the engine coolant through one or more of the engine, a heater core, and a radiator to transfer the heat from the engine coolant to one or more of the engine, the heater core, and the radiator, wherein heat is drawn from the circulating engine coolant as a function of engine heating demand and a cabin heating demand.

4. The method of claim 1, wherein the bypass passage is arranged parallel to a main exhaust passage, and wherein the bypass passage is coupled to the main exhaust passage, downstream of one or more exhaust catalysts.

5. The method of claim 4, further comprising, during the mode, actuating a diverter valve coupling the bypass passage and the main exhaust passage to a first position, and during the another mode, actuating the diverter valve to a second, different position.

6. The method of claim 5, further comprising, during the mode, actuating an EGR valve coupled to the recirculation passage closed, and during the another mode, actuating the EGR valve open.

7. The method of claim 5, wherein the first position of the diverter valve is a fully open position that enables exhaust to be routed to the tailpipe via the bypass passage, and wherein the second position of the diverter valve is a fully closed position which disables exhaust flow to the tailpipe via the bypass passage.

8. An engine method, comprising:
   during an engine cold-start, operating an exhaust system in a mode with exhaust flowing to a tailpipe via a heat exchanger coupled in a bypass passage; and after the engine cold-start, operating the exhaust system in another mode with exhaust recirculating through a recirculation passage to an intake manifold via the heat exchanger, the recirculation passage coupled to the bypass passage downstream of the heat exchanger;
   responsive to exhaust pressure, operating the exhaust system in a further mode with a first portion of the exhaust flowing to the tailpipe via the heat exchanger and second, remaining portion of the exhaust flowing to the intake manifold through the recirculation passage via the heat exchanger.

9. The method of claim 8, wherein a ratio of the first portion to the second portion is further based on EGR demand, and wherein during the further mode, the diverter valve is in between the first and second position.

10. An engine system coupled to a vehicle, comprising:
    an engine intake manifold;
    an exhaust passage including one or more catalysts and a diverter valve, the exhaust passage leading to a tailpipe;
    a bypass passage coupled to the exhaust passage from downstream of the catalyst to upstream of the tailpipe, the bypass passage including a heat exchanger;
    a coolant system including coolant lines for circulating coolant into and out of the heat exchanger, the heat exchanger fluidically coupling the heat exchanger to an engine block and a heater core;
    a temperature sensor for sensing engine coolant temperature;
    an exhaust gas recirculation (EGR) passage with an EGR valve for recirculating exhaust gas from downstream of the heat exchanger to the engine intake manifold; and
    a controller with computer readable instructions stored on non-transitory memory that when executed cause the controller to:
       estimate engine temperature via the temperature sensor;
       in response to a lower than threshold engine temperature, close the EGR valve and shift the diverter valve to a first position to operate the engine exhaust system in a first mode enabling exhaust flow from downstream of the catalyst to the tailpipe via the bypass passage and the heat exchanger;
       after engine temperature is higher than the threshold engine temperature, transition the EGR valve from the closed position to an open position and the diverter valve from the first position to a second position to operate the engine exhaust system in a second mode enabling exhaust recirculation from downstream of the catalyst to the engine intake manifold via the heat exchanger; and
       after engine temperature is higher than the threshold engine temperature, and responsive to exhaust pressure, transition the EGR valve from the closed position to the open position and the diverter valve from the first position to a position in-between the first position and the second position to operate the engine exhaust system in a third mode enabling exhaust recirculation from downstream of the catalyst to the engine intake manifold via the heat exchanger concurrent to exhaust flow from downstream of the catalyst to the tailpipe via the bypass passage and the heat exchanger.

11. The system of claim 10, wherein the position in-between the first position and the second position is based on the exhaust pressure.

12. The system of claim 10, wherein the controller includes further instructions for:
    in each of the first, second, and third mode, circulate coolant though the heat exchanger to transfer heat from exhaust flowing through the heat exchanger to the coolant system.

13. The system of claim 12, wherein the controller includes further instructions for:
    based on an engine heating demand and a passenger cabin heating demand, transfer the heat to the engine and/or a passenger cabin via the heater core.

14. A system for a vehicle, comprising:
    a main exhaust passage including an exhaust catalyst and a diverter valve;
    a bypass passage housing a heat exchanger, the bypass passage coupled to the main exhaust passage downstream of the exhaust catalyst;
    a exhaust gas recirculation (EGR) passage including an EGR valve for flowing exhaust gas from downstream of the heat exchanger to an engine intake manifold;
    a coolant system including distinct coolant lines for circulating coolant into and out of the heat exchanger;
    an engine temperature sensor;
    an exhaust pressure sensor; and
    a controller with computer-readable instructions stored on non-transitory memory for:
       when engine temperature is lower than a threshold, operate in a first mode with the EGR valve closed and the diverter valve in a first position, the first mode enabling exhaust flow from downstream of the catalyst to the tailpipe via the bypass passage and the heat exchanger;
       after engine temperature is higher than the threshold engine temperature, selecting between operating in a second mode or a third mode based on exhaust pressure, the second mode including the EGR valve transitioned from the closed position to an open position and the diverter valve transitioned from the first position to a second position, the third mode including the EGR valve transitioned from the closed position to the open position and the diverter valve transitioned from the first position to another position in-between the first and second position; and
       during all modes, circulating coolant through the heat exchanger.

15. The system of claim 14, wherein operating in the second mode enables exhaust recirculation from downstream of the catalyst to the engine intake manifold via the EGR passage and the heat exchanger.

16. The system of claim 14, wherein operating in the third mode enables a portion of exhaust to be flowed to the tailpipe via the heat exchanger and another, remaining portion of exhaust to be recirculated from downstream of the catalyst to the engine intake manifold via the EGR passage and the heat exchanger.

17. The system of claim 14, wherein the controller includes further instructions for, after circulating coolant through the heat exchanger, flowing heated coolant through an engine block and a heater core based on engine heating demand relative to vehicle cabin heating demand.

* * * * *